US009457998B1

(12) United States Patent
Easterly

(10) Patent No.: US 9,457,998 B1
(45) Date of Patent: Oct. 4, 2016

(54) DEVICES FOR LOCKING A SPRING ASSEMBLY AND RELATED USES THEREOF

(71) Applicant: Kevin Easterly, Greeneville, TN (US)

(72) Inventor: Kevin Easterly, Greeneville, TN (US)

( * ) Notice: Subject to any disclaimer, the term of this patent is extended or adjusted under 35 U.S.C. 154(b) by 83 days.

(21) Appl. No.: 14/210,668

(22) Filed: Mar. 14, 2014

Related U.S. Application Data

(60) Provisional application No. 61/785,452, filed on Mar. 14, 2013.

(51) Int. Cl.
E02C 3/00 (2006.01)
B66F 7/24 (2006.01)
F16D 63/00 (2006.01)

(52) U.S. Cl.
CPC ............... B66F 7/243 (2013.01); F16D 63/00 (2013.01)

(58) Field of Classification Search
USPC ................. 254/88, 88 R; 446/85; 280/124.1, 280/124.174, 124.175
See application file for complete search history.

(56) References Cited

U.S. PATENT DOCUMENTS

| 459,086 | A | | 9/1891 | White |
| 2,012,635 | A | | 8/1935 | Paden |
| 2,600,742 | A | | 6/1952 | Drum |
| 2,631,007 | A | | 3/1953 | Copus |
| 3,178,156 | A | * | 4/1965 | Rigers .................... B66F 7/243 254/88 |
| 3,252,544 | A | | 5/1966 | Lill |
| 3,386,703 | A | | 6/1968 | Thumma |
| 3,542,157 | A | | 11/1970 | Noah |
| 3,638,910 | A | | 2/1972 | Nellis et al. |
| 3,665,538 | A | | 5/1972 | Smith |
| 3,833,236 | A | * | 9/1974 | Davis .................... B60G 21/045 267/262 |
| 3,915,430 | A | | 10/1975 | Chromy et al. |
| 3,994,474 | A | | 11/1976 | Finkbeiner |
| 4,050,403 | A | | 9/1977 | Miller |
| 4,327,896 | A | | 5/1982 | Whitehead |
| 4,394,888 | A | | 7/1983 | Clarke |
| 4,488,326 | A | | 12/1984 | Cherry |
| 4,534,544 | A | | 8/1985 | Heide |

(Continued)

FOREIGN PATENT DOCUMENTS

WO    WO 2011/132186    10/2011

OTHER PUBLICATIONS

United States Patent and Trademark Office, Office Action, U.S. Appl. No. 14/210,722 dated Nov. 30, 2015.

(Continued)

Primary Examiner — Joseph J Hail
Assistant Examiner — Shantese McDonald
(74) Attorney, Agent, or Firm — Kilpatrick Townsend & Stockton LLP

(57) ABSTRACT

In certain embodiments of the invention, devices for locking a spring assembly on a tandem-axle vehicle are provided. Some embodiments relate to methods of locking a spring assembly on a tandem-axle vehicle. In some embodiments, devices for locking a spring assembly on a tandem-axle vehicle, such devices comprising: a block having a top surface, a bottom surface, and a plurality of side surfaces between the top surface and the bottom surface, wherein the top surface may or may not be parallel to the bottom surface, wherein the distance between the top surface and the bottom surface is between about 2 and about 25 cm, and wherein the top surface is angled between 5 and 45 degrees with respect to the bottom surface; wherein the block is adapted to be inserted between a first leaf spring and a frame of a vehicle to lock the vehicle's spring assembly.

23 Claims, 23 Drawing Sheets

(56) References Cited

U.S. PATENT DOCUMENTS

| | | |
|---|---|---|
| 4,724,930 A | 2/1988 | VanLierop |
| 4,920,596 A | 5/1990 | Stevens |
| 4,995,130 A | 2/1991 | Hahn et al. |
| 5,031,726 A | 7/1991 | Wakamiya |
| 5,052,422 A | 10/1991 | Franz et al. |
| 5,099,956 A | 3/1992 | Curran |
| 5,213,287 A | 5/1993 | Barron |
| 5,503,368 A | 4/1996 | Torres |
| 5,544,861 A | 8/1996 | Wisner |
| 5,716,040 A | 2/1998 | Torres |
| 5,848,926 A * | 12/1998 | Jardetzky ............ A63H 33/048 273/DIG. 3 |
| 5,855,359 A | 1/1999 | Chipperfield |
| 5,915,672 A | 6/1999 | Dickey |
| 6,135,420 A | 10/2000 | Johnston |
| 6,182,796 B1 | 2/2001 | Perlstein et al. |
| 6,186,279 B1 | 2/2001 | Blocker et al. |
| 6,443,413 B1 | 9/2002 | Hawkins |
| D468,512 S | 1/2003 | Hernandez |
| 6,539,572 B2 | 4/2003 | Ware |
| 6,564,414 B1 | 5/2003 | Jamison |
| 6,644,615 B1 | 11/2003 | Liu |
| 6,729,826 B2 | 5/2004 | Brehmer et al. |
| 7,033,119 B2 | 4/2006 | Baker |
| 7,100,898 B1 | 9/2006 | Chang |
| 7,220,222 B2 | 5/2007 | Springston et al. |
| 7,308,971 B2 | 12/2007 | Liebetreu et al. |
| 7,316,043 B2 | 1/2008 | Henblad |
| 7,334,804 B2 | 2/2008 | Mitchell |
| 7,350,255 B2 | 4/2008 | Zhang |
| 7,434,782 B2 | 10/2008 | Arzouman |
| 7,731,013 B2 | 6/2010 | Milner et al. |
| 8,052,120 B2 | 11/2011 | Bacon |
| 8,152,100 B2 | 4/2012 | Nicholas et al. |
| 8,201,807 B2 | 6/2012 | Hernandez, Jr. |
| 8,286,997 B2 | 10/2012 | Kimener |
| 8,398,056 B1 | 3/2013 | Morrison |
| 8,528,929 B2 | 9/2013 | Kimener |
| 9,080,722 B2 | 7/2015 | Ceravolo et al. |
| 2003/0079288 A1 | 5/2003 | Cook et al. |
| 2004/0119260 A1* | 6/2004 | Fenton ..................... B60G 5/00 280/124.174 |
| 2006/0051191 A1 | 3/2006 | Dupuy et al. |
| 2008/0099750 A1 | 5/2008 | Arzouman |
| 2008/0296542 A1 | 12/2008 | Manev et al. |
| 2009/0081918 A1* | 3/2009 | Shen, Jr. ................ A63H 33/04 446/85 |
| 2009/0211879 A1 | 8/2009 | Milner et al. |
| 2009/0272953 A1 | 11/2009 | Wolf |
| 2009/0282953 A1 | 11/2009 | Lin |
| 2009/0307853 A1 | 12/2009 | Setzer, Jr. et al. |
| 2010/0270523 A1 | 10/2010 | Schmitt et al. |
| 2011/0251935 A1 | 10/2011 | German et al. |
| 2012/0241234 A1 | 9/2012 | Wright |
| 2013/0193392 A1 | 8/2013 | McGinn |

OTHER PUBLICATIONS

United States Patent and Trademark Office, Response to Office Action, U.S. Appl. No. 14/210,722 dated Feb. 29, 2016.

* cited by examiner

DEVICES FOR LOCKING A SPRING ASSEMBLY AND RELATED USES THEREOF

CROSS-REFERENCE TO RELATED APPLICATION

This application claims priority to U.S. Provisional Patent Application Ser. No. 61/785,452, filed on Mar. 14, 2013, the entire disclosure of which is hereby incorporated by reference.

FIELD OF THE INVENTION

Embodiments of the invention relate generally to devices for locking spring assemblies on tandem-axle vehicles, such as trailers or trucks, and methods of their use.

BACKGROUND

Vehicles, such as trailers or trucks, including those having a tandem-axle arrangement, find use in a wide variety of settings, including freight transportation and agriculture. In many instances, such vehicles are used in settings where use of a conventional jack is impractical. For example, high winds may cause shifting of a jacked trailer, such that the frame of the trailer becomes disengaged from the jack. Livestock or certain movable objects within the trailer may also cause the trailer to become disengaged from the jack. In other instances, use of a conventional jack may be inconvenient because the ground surface is uneven or lacks firmness, such as in an open field or on a dirt road. In some other instances, use of a conventional jack may be impossible because one or both tires of a tandem-axle vehicle are completely flat or nearly so, such that the jack cannot provide sufficient ground clearance to be able to remove the flat tire and replace it. In some instances, such as when the vehicle clearance is particularly low, it may be difficult or impossible to fit a conventional jack under the frame to permit lifting of the vehicle.

Ramp jacks are often used as a replacement for conventional jacks in such situations. However, one may need to own multiple sizes of such ramp jacks, so as to be able to jack a variety of different tandem-axle vehicles in a variety of different settings. Moreover, ramp jacks generally require that the tire on at least one of the two axles be fully inflated or nearly so. Otherwise, the jack cannot provide enough lift.

SUMMARY

Various embodiments of the present invention relate to jacks, methods of using jacks, methods of elevating a vehicle, devices for locking a spring assembly on a tandem-axle vehicle, methods of locking a spring assembly on a tandem-axle vehicle, and others. In some embodiments, the jacks and related methods can be particularly useful in connection with tandem-axle vehicles.

In some embodiments, jacks of the present invention comprise: (a) a base; (b) a top surface, which is substantially parallel to the base and is separated from the base by a distance of 5 to 70 cm, thereby forming a first volume between the base and the top surface; (c) a first ramp proximate a first end of the top surface and extending downward at an angle between 10 degrees and 70 degrees with respect to the top surface; and (d) a lifting mechanism positioned substantially in the first volume.

In some embodiments, jacks of the present invention comprise: (a) a base; (b) a top surface, which is substantially parallel to the base and is separated from the base by a distance of 5 to 70 cm, thereby forming a first volume between the base and the top surface; (c) a first ramp proximate a first end of the top surface and extending downward at an angle between 10 degrees and 70 degrees with respect to the top surface; (d) a second ramp proximate a first end of the top surface and extending downward at an angle between 10 degrees and 70 degrees with respect to the top surface; and (e) a lifting mechanism positioned substantially in the first volume.

Jacks of the present invention, in some embodiments, comprise: (a) a base; (b) a top surface, which is substantially parallel to the base and is separated from the base by a distance of 5 to 70 cm, thereby forming a first volume between the base and the top surface; (c) a first ramp proximate a first end of the top surface and extending downward at an angle between 10 degrees and 70 degrees with respect to the top surface; and (d) a lifting mechanism positioned substantially in the first volume, wherein the lifting mechanism comprises at least two pistons, wherein at least a portion of the top surface is disposed on the two or more pistons such that the two or more pistons lift the top surface when the lifting mechanism is actuated. In some embodiments, jacks of the present invention comprise: (a) a base; (b) a top surface, which is substantially parallel to the base and is separated from the base by a distance of 5 to 70 cm, thereby forming a first volume between the base and the top surface; (c) a first ramp proximate a first end of the top surface and extending downward at an angle between 10 degrees and 70 degrees with respect to the top surface; (d) a second ramp proximate a second end of the top surface and extending downward at an angle between 10 degrees and 70 degrees with respect to the top surface; and (e) a lifting mechanism positioned substantially in the first volume, wherein the lifting mechanism comprises at least two pistons, wherein at least a portion of the top surface is disposed on the two or more pistons such that the two or more pistons lift the top surface when the lifting mechanism is actuated.

In some embodiments of jacks of the present invention, the lifting mechanism can comprise a crank lifting mechanism, a lever-based lifting mechanism, a hydraulic lifting mechanism, or a pneumatic lifting mechanism.

In some embodiments, the invention provides methods of using such jacks to elevate a vehicle, such as a trailer or truck, including a tandem-axle vehicle. In some such embodiments, the invention provides methods for elevating a vehicle, the method comprising: providing a jack according to any of the embodiments disclosed herein; and positioning a wheel (or tire) on the top surface. In embodiments where the vehicle is a tandem-axle vehicle, the lifting mechanism in the jack may not need to be activated. In some embodiments, the method further comprises elevating at least a portion of the top surface with the lifting mechanism. In some such embodiments, the vehicle can be a tandem-axle vehicle. In some other embodiments, the vehicle is not a tandem-axle vehicle. For example, in some embodiments, the jack can be positioned under a portion of the vehicle besides the tire, such as under part of the frame of the vehicle.

In some embodiments, jacks of the present invention comprise: (a) a base having a first end, a second end, a first side, and a second side; (b) a first ramp, which extends from the base at an angle of from 10 degrees to 70 degrees with respect to the base; (c) a second ramp, which extends from the base at an angle of from 10 degrees to 70 degrees with respect to the base; (d) a first top surface, which extends from the ends of the first and second ramps that are opposite the ends that extends from the base; and (e) a removable section that comprises a portion of the first top surface and the first ramp, which, when removed, provides a second top surface and a third ramp, wherein the third ramp extends between a first end of the first top surface and a first end of the second top surface, and wherein a second end of the second top surface extends from the first ramp; wherein the base, the first top surface and the second top surface are substantially parallel to each other; and wherein the first ramp and the third ramp are substantially parallel to each other.

In some embodiments, jacks for use with tandem-axle vehicles comprise: (a) a base having a first end, a second end, a first side, and a second side; (b) a first ramp, which extends from the base at an angle of from 10 degrees to 70 degrees with respect to the base; (c) a second ramp, which extends from the base at an angle of from 10 degrees to 70 degrees with respect to the base; (d) a first top surface, which extends from the ends of the first and second ramps that are opposite the ends that extends from the base; and (e) a second top surface having a first end that extends from the first ramp; and (f) a third ramp, which extends between a first end of the first top surface and a second end of the second top surface; wherein the base, the first top surface and the second top surface are substantially parallel to each other; and wherein the first ramp and the third ramp are substantially parallel to each other.

In some embodiments, the invention provides methods of elevating a tandem-axle vehicle, the method comprising: providing a jack according to any of the embodiments of the invention; and situating a wheel of a first axle of the tandem-axle vehicle on the first top surface.

In some embodiments, the invention provides devices for locking a spring assembly on a tandem-axle vehicle, such devices comprising: a block having a top surface, a bottom surface, and a plurality of side surfaces between the top surface and the bottom surface, wherein the top surface is substantially parallel to the bottom surface, wherein the distance between the top surface and the bottom surface is between about 2 and about 25 cm, and wherein the block is adapted to be inserted between a first leaf spring and a frame of a vehicle to lock the vehicle's spring assembly. In some embodiments, the distance between the top surface and the bottom surface is between about 5 and about 15 cm.

In some embodiments, the invention provides devices for locking a spring assembly on a tandem-axle vehicle, such devices comprising: a block having a top surface, a bottom surface, and a plurality of side surfaces between the top surface and the bottom surface, wherein the top surface is not parallel to the bottom surface, wherein the distance between the top surface and the bottom surface is between about 2 and about 25 cm, and wherein the top surface is angled between 5 and 45 degrees with respect to the bottom surface; wherein the block is adapted to be inserted between a first leaf spring and a frame of a vehicle to lock the vehicle's spring assembly. In some embodiments, the distance between the top surface and the bottom surface of the block is between about 5 and about 15 cm.

In some embodiments, the invention provides methods of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising: providing a block having a top surface, a bottom surface, and a plurality of side surfaces between the top surface and the bottom surface, wherein the top surface is substantially parallel to the bottom surface, and wherein the distance between the top surface and the bottom surface is between about 2 and about 25 cm; and inserting the block between the first leaf spring and the frame, such that the top surface of the block contacts the frame and the bottom surface of the block contacts the first leaf spring. In some embodiments, the distance between the top surface and the bottom surface of the block is between about 5 and about 15 cm.

In some embodiments, the invention provides methods of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising: providing a block having a top surface, a bottom surface, and a plurality of side surfaces between the top surface and the bottom surface, wherein the top surface is not parallel to the bottom surface, wherein the distance between the top surface and the bottom surface is between about 2 and about 25 cm, and wherein the top surface is angled between 5 and 45 degrees with respect to the bottom surface; and inserting the block between the first leaf spring and the frame, such that the top surface of the block contacts the frame and the bottom surface of the block contacts the first leaf spring. In some embodiments, the distance between the top surface and the bottom surface of the block is between about 5 and about 15 cm.

In some embodiments, devices for locking a spring assembly on a tandem-axle vehicle comprise: a block having a top surface, a bottom surface, and a plurality of side surfaces between the top surface and the bottom surface, wherein the distance between the top surface and the bottom surface is between about 2 and about 25 cm, wherein the bottom surface comprises at least three subsurfaces, such that a first subsurface and a second subsurface are in substantially the same plane, and a third subsurface is disposed between the first and second subsurfaces and forms a notch in the bottom surface; wherein the block is adapted to be inserted between a first leaf spring and a frame of a vehicle to lock the vehicle's spring assembly. In some embodiments, the distance between the top surface and the bottom surface of the block is between about 5 and about 15 cm.

In some embodiments, the invention provides methods of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising: providing a block having a top surface, a bottom surface, and a plurality of side surfaces between the top surface and the bottom surface, wherein the distance between the top surface and the bottom surface is between about 2 and about 25 cm, wherein the bottom surface comprises at least three subsurfaces, such that a first subsurface and a second subsurface are in substantially the same plane, and a third subsurface is disposed between the first and second subsurfaces and forms a notch in the bottom surface; and inserting the block between the frame and the first leaf spring and between the frame and the first equalizer, such that the top surface of the block contacts the frame, the first subsurface of the bottom surface contacts the leaf spring, and the second subsurface of the bottom surface contacts the equalizer. In some embodiments, the distance between the top surface and the bottom surface of the block is between about 5 and about 15 cm.

Some embodiments of the present invention relate to systems for elevating a tandem-axle vehicle. In some embodiments, such systems comprise a device for locking a spring assembly on a tandem-axle vehicle and a ramp jack. The device for locking a spring assembly on a tandem-axle vehicle can include any of the devices for locking a spring assembly on a tandem-axle vehicle disclosed herein. In some embodiments, the ramp jack comprises any of the jacks of the present invention disclosed herein. The ramp jack, in some embodiments, comprises a conventional ramp jack.

Further embodiments and aspects of the invention are described in more detail below.

BRIEF DESCRIPTION OF DRAWINGS

The following figures and drawings illustrate various embodiments of the invention, and are provided for illustrative purposes only. No figure or drawing is intended to limit the scope of the claimed subject matter. To the extent that any of the figures show numerical dimensions, such dimensions are provided for illustrative purposes only, and are not intended to limit the scope of the invention.

DETAILED DESCRIPTION

Figure 1:
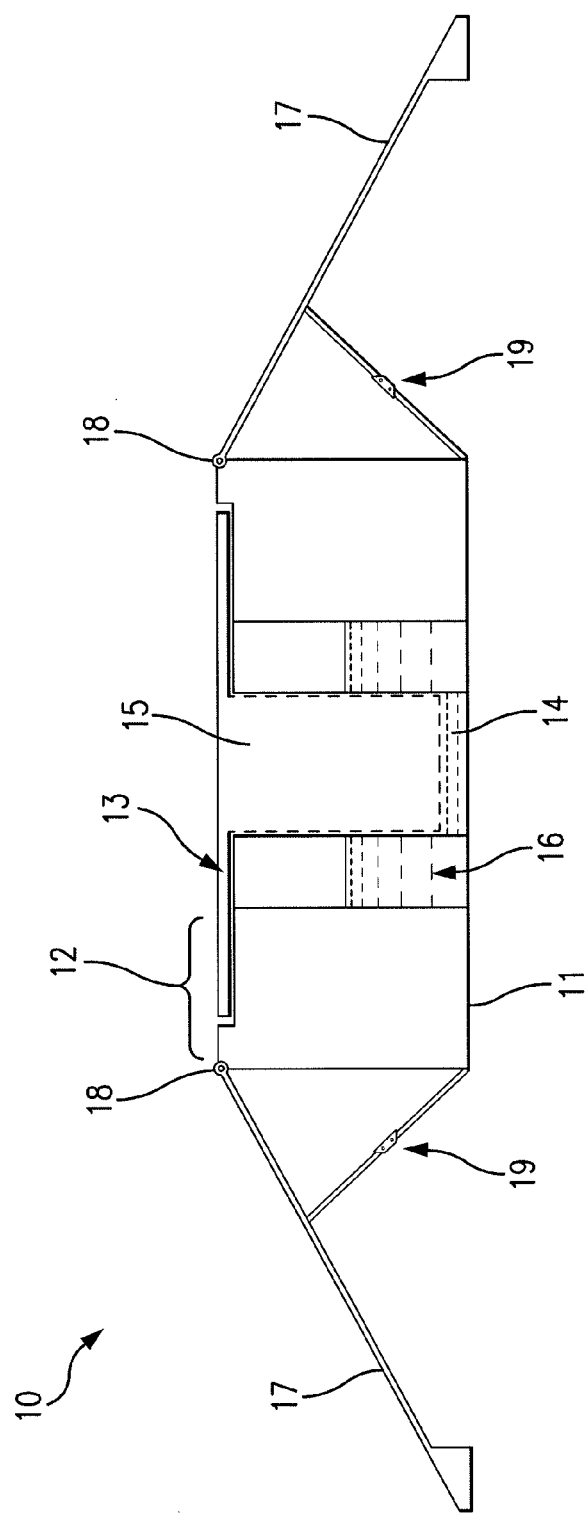
FIG. 1 depicts a hydraulic jack having a single piston and a single barrel according to one non-limiting embodiment of the present invention.

The following description recites various aspects and embodiments of the present invention. No particular embodiment is intended to define the scope of the invention. Rather, the embodiments merely provide non-limiting examples various methods and systems that are at least included within the scope of the invention. The description is to be read from the perspective of one of ordinary skill in the art; therefore, information well known to the skilled artisan is not necessarily included.

As used herein, "a," "an," and "the" include plural referents, unless expressly and unequivocally disclaimed.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Some embodiments of the present invention relate to jacks. In some embodiments, such jacks comprise: (a) a base; (b) a top surface, which is substantially parallel to the base and is separated from the base by a distance of 5 to 70 cm, thereby forming a first volume between the base and the top surface; (c) a first ramp proximate a first end of the top surface and extending downward at an angle between 10 degrees and 70 degrees with respect to the top surface; and (d) a lifting mechanism positioned substantially in the first volume.

The base can have any suitable configuration. In some embodiments, the base has a circular shape. In some other embodiments the base has a square or rectangular shape. In some other embodiments, the base has a hexagonal, octagonal, or oval shape. The base can be of any suitable size. In some embodiments, the diameter of the base ranges from 10 to 100 cm. In this context, "diameter" does not necessarily imply that the base is a circle; the term merely refers to the distance across the base along a line that is perpendicular to at least one edge of the base. For example, with a square base, diameter would refer to the length of one of its sides. With a rectangular base, for example, the diameter could refer to its width or length. In some other embodiments, the diameter of the base ranges from 15 to 50 cm, or from 20 to 50 cm, or from 20 to 40 cm. In some embodiments where the base is rectangular, the base has a width that ranges from 10 to 50 cm, or from 15 to 40 cm, and a length that ranges from 20 to 100 cm, or from 20 to 70 cm.

In some embodiments, the underside of the base (i.e., the side that lies to the exterior of the jack and which generally would contact the road surface or ground) can be adapted to improve the contact between the base surface and the surface onto which the jack is placed (e.g., asphalt, concrete, dirt, grass, gravel, and the like). In some such embodiments, the underside of the base comprises one or more structures that extend outwardly from the jack. These extending structures can be of any suitable shape. In some embodiments, the extending structures are cleats, which can be blunt or sharp. In some other embodiments, the extending structures are slats that lie substantially perpendicular to the direction in which the vehicle would move along the jack. Such structures can extend beyond the base of the ramp for any suitable distance. In some embodiments, the extending structures extend from 0.5 cm to 10 cm, or from 1 cm to 5 cm, or from 2 cm to 4 cm, beyond the base of the ramp. In some embodiments, a material that improves contact with the surface onto which the jack is placed can be coupled to surface of the base. For example, a rubber material can be adhered to the base, and the rubber material can include ridges, dimples, or other texture to improve the contact in some embodiments. Other materials could also be used in some embodiments. Further, in some embodiments, the base is solid, while in other embodiments, the base is not solid or is only partly solid.

The top surface can have any suitable configuration. In some embodiments, the top surface has a circular shape. In some other embodiments, the top surface has a square or rectangular shape. In some other embodiments, the top surface has a hexagonal, octagonal, or oval shape. The top surface can have any suitable size. In some embodiments, the diameter of the top surface ranges from 10 to 100 cm. In this context, "diameter" does not necessarily imply that the top surface is a circle; the term merely refers to the distance across the top surface along a line that is perpendicular to at least one edge of the top surface. For example, with a square top surface, diameter would refer to the length of one of its sides. With a rectangular top surface, diameter would refer to its width. In some other embodiments, the diameter of the top surface ranges from 15 to 50 cm, or from 20 to 50 cm, or from 20 to 40 cm. In some embodiments, the top surface has the same shape as the base. In other embodiments, the top surface does not have the same shape as the base. In some embodiments, both the top surface and the base have a square or rectangular shape. In some embodiments where the top surface is rectangular, the top surface has a width that ranges from 10 to 50 cm, or from 15 to 40 cm, and a length that ranges from 5 to 50 cm, or from 10 to 40 cm.

The top surface is elevated above the base. The top surface can be elevated above the base by any suitable distance. In some embodiments, the top surface is elevated above the base by a distance of from 5 to 100 cm, or from 5 to 70 cm, or from 10 to 60 cm. In some embodiments, the top surface and the base lie in substantially parallel planes, meaning that the angle formed by the extended surfaces of the base and the top surface is within ±10 degrees of 0 degrees, or within ±5 degrees of 0 degrees, or ±3 degrees of 0 degrees, or ±1 degrees of 0 degrees.

The elevation of the top surface above the base forms a volume between the top surface and the base. In some embodiments, this volume is enclosed by one or more side surfaces, for example, side surfaces that extend between the edges of the top surface and the edges of the bottom surface can serve to enclose the volume between the top surface and the bottom. In some embodiments, one or more of the sides of the volume are not enclosed.

In some embodiments, the jack has a first ramp proximate to a first end of the top surface that extends downward (e.g., toward the ground). In some embodiments, the first ramp is a solid surface. The ramp need not extend directly from the edge of the top surface, but proximate to it.

In some embodiments, the ramp extends from the edge of the top surface. In some other embodiments, the ramp extends from a point within 10 cm, or within 7 cm, or within 5 cm, or within 3 cm of an edge of the top surface.

The first ramp can extend downward at any suitable angle. In some embodiments, the ramp extends downward at an angle that ranges from 10 to 70 degrees, or from 15 to 60 degrees, or from 20 to 50 degrees, or from 25 to 40 degrees.

The first ramp can have any suitable width. In some embodiments, the width of the first ramp can be determined based upon the desired tire or wheel width that the jack is intended to accommodate (e.g., a width that is somewhat wider than the maximum width of the tire or wheel for which the jack is intended). In some embodiments where the ramp surface is rectangular, the ramp has a width that ranges from 10 to 50 cm, or from 15 to 40 cm, and a length that ranges from 5 to 70 cm, or from 10 to 50 cm. In some embodiments, the first ramp has a width that is substantially the same as the length of the end of the top surface closest to the point from which it extends, meaning that the two distances are less than 5 cm different, or less than 3 cm different, or less than 1 cm different, or less than 0.5 cm different.

The first ramp can have any suitable length. Suitable lengths may depend on various factors, including but not limited to the length of the sides of the top surface, the angle formed by the first ramp with respect to the top surface, and the diameter of the tire or wheel of the vehicle for which the jack is intended to accommodate. In some embodiments, the first ramp has a length that ranges from 20 cm to 250 cm, or from 25 to 200 cm, or from 30 to 150 cm, or from 35 to 100 cm.

The first ramp may be attached to the rest of the jack in any suitable manner, including, but not limited to, hinges, pin assemblies, screws, bolts, and the like. In some embodiments, the first ramp is attached to the rest of the jack via one or more hinges or one or more pin assemblies.

In some embodiments, the first ramp is removable. Removability can be achieved by any suitable means. In some embodiments, the ramp is attached to the rest of the jack via one or more pin assemblies or one or more hinges that permit detachment of the ramp from the rest of the jack. Upon removal, the removed ramp can be stored in any suitable manner. In some embodiments, the removed ramp is disposed on the top surface or the base, so as to allow for more compact storage of the jack.

In some embodiments, the first ramp is supported. In some embodiments, the support is provided by one or more distensions or braces that extend from the ramp (e.g., in the central region) and make contact with the surface onto which the jack is placed (e.g., the ground) or proximate to an edge of the base, or at the edge of the base. Any suitable number of such braces can be used, for example, 1 or more, 2 or more, 4 or more, etc. up to 8, 10, or 12. In some embodiments, these braces fold back toward the ramp so that, when the ramp is not in use, they do not extend from the ramp. In some embodiments, the first ramp has a flap on its underside on the end that lies farthest from the rest of the jack where the flap provides additional footing for the end of the ramp. In some embodiments, one or more trusses or similar support structures can be incorporated into the first ramp to provide support.

In some embodiments, the first ramp comprises a flap, wherein the flap lies at a lower end of the first ramp and is adapted to extend along the surface onto which the jack is placed. The flap can assist in the transition of the vehicle or trailer's wheel from the surface onto which the jack is placed (e.g., ground or road) onto the ramp. The flap, for example, can help prevent the jack from sliding as a vehicle or trailer is driven onto the first ramp. The flap can be constructed from a variety of different materials in varying embodiments including, for example, woven fabric, chainlinks, plastic, metal, rope, or other materials that persons of skill in the art can identify.

The first ramp may be constructed in a manner such that additional support is not needed. For example, the first ramp can be constructed from metal. Persons of ordinary skill in the art can select the appropriate type of metal and thickness to provide the desired weight support. In some embodiments, the ramp can be arched to also provide support.

In some embodiments, the jack comprises a second ramp proximate to a second end of the top surface that extends downward from the top surface. In some embodiments, the second end of the top surface is opposite the end of the top surface from where the first ramp extends downward (e.g., toward the ground). In some embodiments, the second ramp is a solid surface. The ramp need not extend directly from the edge of the top surface, but proximate to it. In some embodiments, the ramp extends from the second edge of the top surface. In some other embodiments, the ramp extends from a point within 10 cm, or within 7 cm, or within 5 cm, or within 3 cm of a second edge of the top surface.

The second ramp can extend downward at any suitable angle. In some embodiments, the ramp extends downward at an angle that ranges from 10 to 70 degrees, or from 15 to 60 degrees, or from 20 to 50 degrees, or from 25 to 40 degrees.

The second ramp can have any suitable width. In some embodiments, the width of the second ramp can be determined based upon the desired tire or wheel width that the jack is intended to accommodate (e.g., a width that is somewhat wider than the maximum width of the tire or wheel for which the jack is intended). In some embodiments, the second ramp has a width that is substantially the same as the length of the end of the top surface closest to the point from which it extends, meaning that the two distances are less than 5 cm different, or less than 3 cm different, or less than 1 cm different, or less than 0.5 cm different.

The second ramp can have any suitable length. Suitable lengths may depend on various factors, including but not limited to the length of the sides of the top surface, the angle formed by the first ramp with respect to the top surface, and the diameter of the tire or wheel of the vehicle for which the jack is intended to accommodate. In some embodiments, the second ramp has a length that ranges from 20 cm to 250 cm, or from 25 to 200 cm, or from 30 to 150 cm, or from 35 to 100 cm.

The second ramp may be attached to the rest of the jack in any suitable manner, including, but not limited to, hinges, pin assemblies, screws, bolts, and the like. In some embodiments, the second ramp is attached to the rest of the jack via one or more hinges or one or more pin assemblies.

In some embodiments, the second ramp is removable. Removability can be achieved by any suitable means. In some embodiments, the ramp is attached to the rest of the jack via one or more pin assemblies or one or more hinges that permit detachment of the ramp from the rest of the jack. Upon removal, the removed ramp can be stored in any suitable manner. In some embodiments, the removed ramp is disposed on the top surface or the base, so as to allow for more compact storage of the jack.

In some embodiments, the second ramp is supported. In some embodiments, the support is provided by one or more distensions or braces that extend from the ramp (e.g., in the central region) and make contact with the surface onto which the jack is placed (e.g., the ground) or proximate to an edge of the base, or at the edge of the base. Any suitable number of such braces can be used, for example, 1 or more, 2 or more, 4 or more, etc. up to 8, 10, or 12. In some embodiments, these braces fold back toward the ramp so that, when the ramp is not in use, they do not extend from the ramp. In some embodiments, the second ramp has a flap on its underside on the end that lies farthest from the rest of the jack where the flap provides additional footing for the end of the ramp. In some embodiments, one or more trusses or similar support structures can be incorporated into the first ramp to provide support.

In some embodiments, the second ramp comprises a flap, wherein the flap lies at a lower end of the second ramp and is adapted to extend along the surface onto which the jack is placed. The flap can assist in the transition of the vehicle or trailer's wheel from the ramp onto the surface onto which the jack is placed (e.g., ground or road) onto the ramp. The flap can be constructed from a variety of different materials in varying embodiments including, for example, woven fabric, chainlinks, plastic, metal, rope, or other materials that persons of skill in the art can identify.

The second ramp may be constructed in a manner such that additional support is not needed. For example, the second ramp can be constructed from metal. Persons of ordinary skill in the art can select the appropriate type of metal and thickness to provide the desired weight support. In some embodiments, the ramp can be arched to also provide support.

In certain embodiments, the jack comprises a lifting mechanism. Any suitable lifting mechanism may be used. In some embodiments, the lifting mechanism is a crank lifting mechanism. In some other embodiments, the lifting mechanism is a lever-based lifting mechanism. In some other embodiments, the lifting mechanism is a hydraulic lifting mechanism. In some other embodiments, the lifting mechanism is a pneumatic lifting mechanism.

In general, the lifting mechanism can be positioned at any suitable location within the jack. For example, the lifting mechanism can be placed within the volume lying between the top surface and the base. While much of the following discussion focuses on hydraulic lifting mechanisms, it should be understood that much of the description can also apply to other lifting mechanisms (e.g., crank lifting mechanisms like scissor jacks, lever-based lifting mechanisms like lever jacks, pneumatic lifting mechanisms, etc.) with some variation depending on differences in size and operation of such lifting mechanisms.

In embodiments where the lifting mechanism is a hydraulic lifting mechanism, the hydraulic lifting mechanism can be placed in any suitable location. In some embodiments, the hydraulic lifting mechanism is positioned within or substantially within (e.g., at least 75% within, or at least 80% within, or at least 90% within) the volume lying between the top surface and the base. Any suitable hydraulic lifting mechanism can be used including hydraulic mechanisms similar to those used in bottle jacks and other hydraulic-type jacks.

In some embodiments, the hydraulic lifting mechanism comprises one or more barrels, one or more pistons (or rams) adapted to fit within the one or more barrels and adapted to translate vertically within the barrels, a fluid cavity, and a pump, such as a hydraulic pump.

The hydraulic lifting mechanism can employ any suitable number of barrels and pistons. In some embodiments, the hydraulic lifting mechanism employs a single barrel and a single piston. In some other embodiments, the hydraulic lifting mechanism employs 2 or more barrels and pistons, or 3 or more barrels and pistons, or up to 6 barrels and pistons. The number of barrels and pistons used in various embodiments may depend on their weight ratings, the available volume within the jack, the size of the top surface of the jack, the desired size of the jack, and others. The barrels and pistons can have any suitable shape and length. In some embodiments, the shape of the barrels and pistons are cylindrical. In other embodiments, they are rectangular. The length of the barrels and pistons will depend on the distance between the top surface and the base. For example, in some embodiments, the barrels and pistons have a length that is at least 50%, or at least 60%, or at least 70%, or at least 80%, or at least 90% of the distance between the base and the top surface.

The hydraulic lifting mechanism can have any suitable number of fluid cavities, for example, one, two, three, four, five, or six. In some embodiments, the fluid cavities are at least partially filled with a fluid, such as a hydraulic fluid. Any suitable hydraulic fluid can be used.

The hydraulic lifting mechanism can also have any suitable number of pumps for pumping hydraulic fluid from the one or more fluid cavities into the barrels. Such pumps are well known in the art. The pump is in fluid communication with a fluid cavity and a barrel. A pump is also connected to an activation mechanism that causes the hydraulic fluid to be pumped from the one or more fluid cavities into the one or more barrels, thereby causing the one or more pistons to rise vertically.

The hydraulic system can all be contained within a single volume, or the volume may be divided into one or more subvolumes and the hydraulic system distributed among the one or more subvolumes.

The one or more pistons are connected to the top surface so that, when the hydraulic mechanism is activated, at least a portion of the top surface is elevated by the one or more pistons. In some embodiments, the top surface contains at least one subsurface (e.g., in a central portion of the top surface), such as a lifting platform, that is disposed on the one or more pistons. The pistons can be connected to the top surface or subsurface(s) in any suitable manner. In some embodiments, the pistons are permanently attached via bolts, an adhesive, welds, or the like.

In certain other embodiments, the top surface comprises a threaded receptacle. The threaded receptacle, among other features, allows one to attach an additional top surface that extends above the top surface of the jack, where the threading allows for the height of this additional top surface to be adjusted up or down.

In some embodiments, the jack includes one or more additional ramps that are adapted to extend from the top surface of the first ramp, such that the additional ramp(s) extend in a downward direction relative to the top surface of the jack, but at an angle that is smaller than the angle formed between the extended plane of the top surface and the extended plane of the removable ramp onto which the additional ramp(s) are disposed. This permits a more gradual incline useful, for example, with low clearance vehicles.

In some embodiments, the ramp is accompanied by one or more support blocks. Such blocks can be solid planks having a thickness of from 1 to 15 cm, or 2 to 10 cm, and a width and length of from 15 to 50 cm, or from 20 to 40 cm. Such blocks can be used in various ways. In some embodiments, the support blocks can be placed atop the top surface, so as to better distribute the weight of the vehicle. In some embodiments, one or more support blocks can be placed under the jack, including under one or more of the ramps, so as to provide a more stable surface on which the jack sits. In some embodiments, one or more of the support blocks can be used as one or more of the additional ramps, described immediately above. The blocks can be made of any suitable material, including, but not limited to, wood, such as hardwood, metal, such as steel, or polymer or polymer composite materials.

The jack can be made of any suitable material or combination of materials, so long as the materials provide sufficient strength to support a tandem-axle vehicle or other vehicle for which the jack is desired to be used. Suitable materials include, but are not limited to: wood, such as hardwood; metals, such as iron and alloys thereof, and steel; polymers and various polymeric composites, such as fiberglass-polymer composites.

Figure 2:
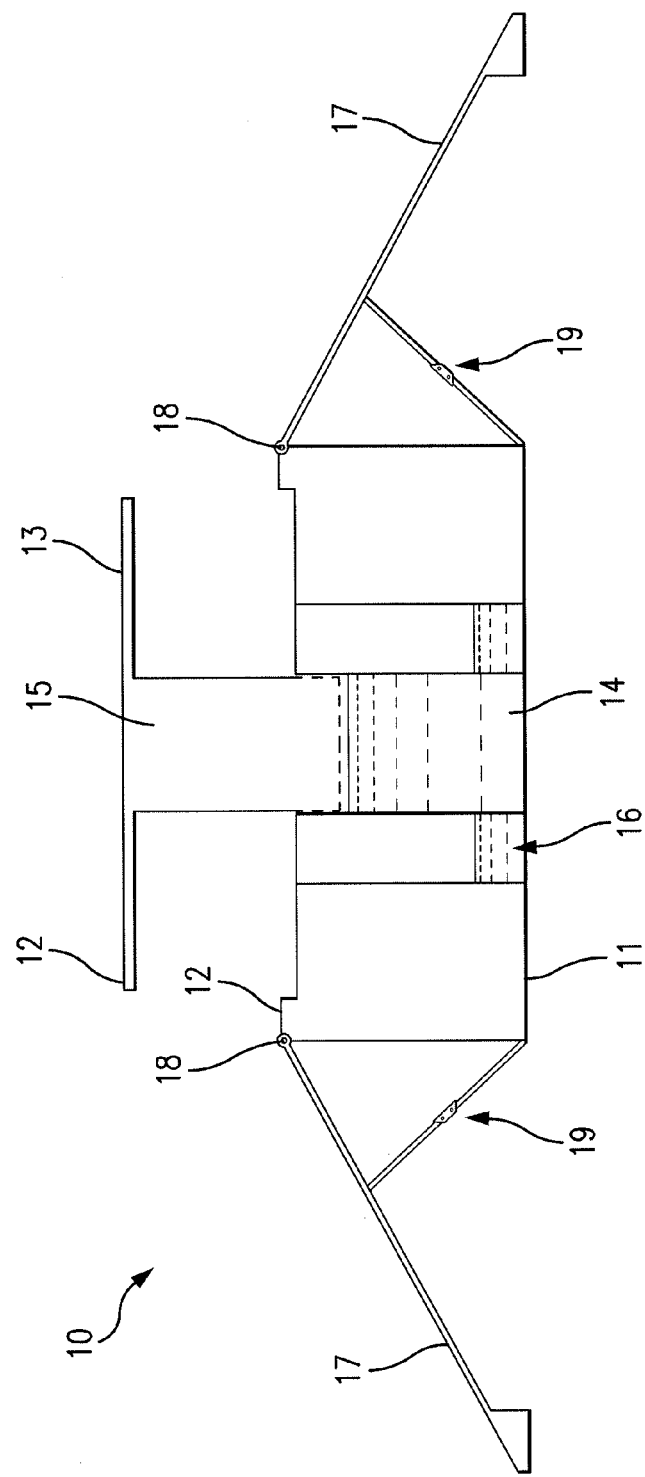
FIG. 2 depicts a hydraulic jack having a single piston and a single barrel in the lifted position according to one non-limiting embodiment of the present invention.

FIG. 1 shows a hydraulic jack 10 according to at least one embodiment of the invention. The jack shows a base 11 a top surface 12, including a lifting platform 13, a barrel 14, a piston 15, a fluid cavity 16, removable ramps 17 connected by hinges or pins 18, and foldable braces 19. FIG. 2 shows the hydraulic jack of FIG. 1 in a lifted position.

Figure 3:
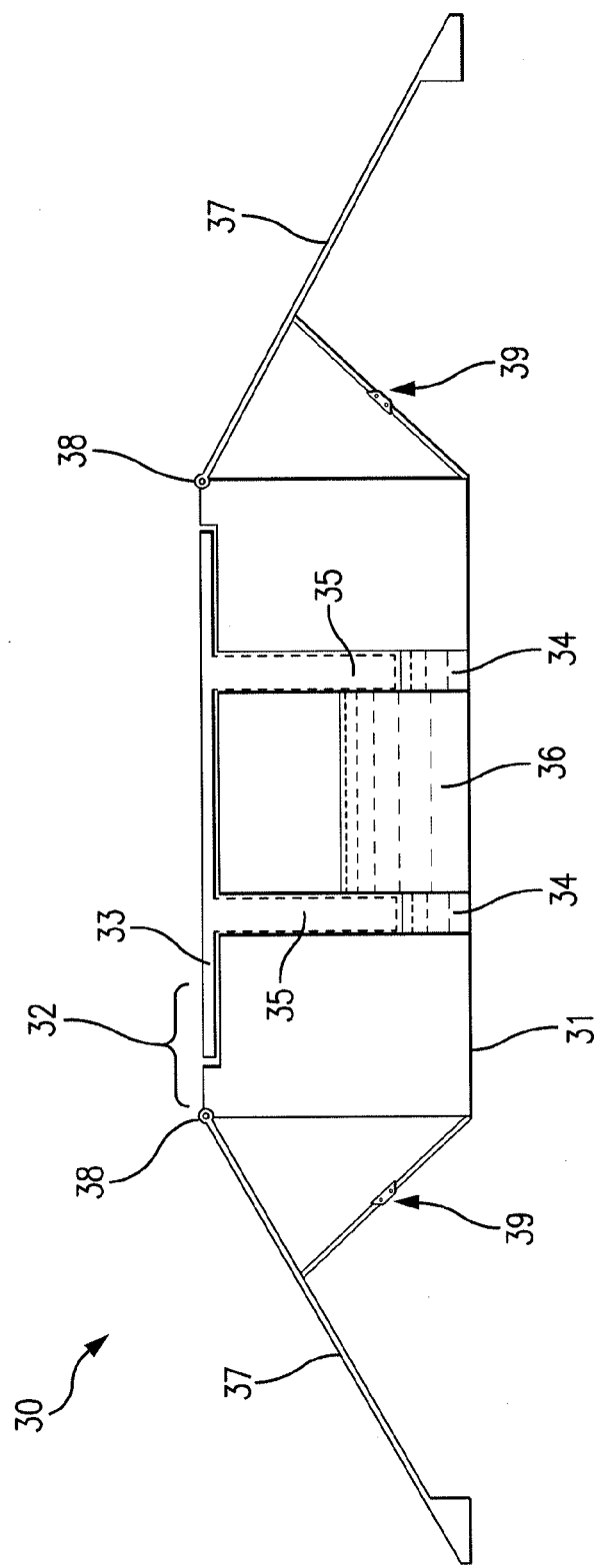
FIG. 3 depicts a hydraulic jack having two pistons and two barrels according to one non-limiting embodiment of the present invention.
Figure 4:
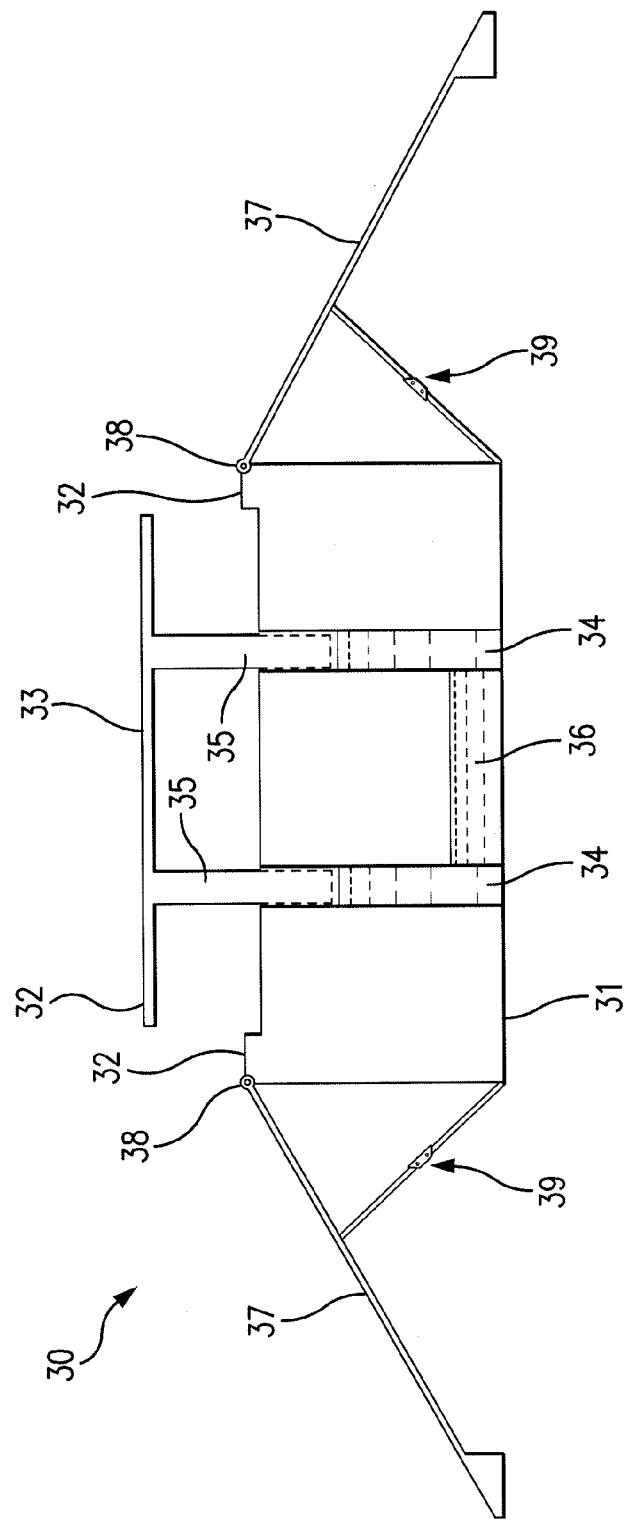
FIG. 4 depicts a hydraulic jack having two pistons and two barrels in the lifted position according to one non-limiting embodiment of the present invention.

FIG. 3 shows a hydraulic jack 30 according to at least one embodiment of the invention that comprises two barrels and pistons. The jack 30 shows a base 31 a top surface 32, including a lifting platform 33, two barrels 34, two pistons 35, a fluid cavity 36, removable ramps 37 connected by hinges or pins 38, and foldable braces 39. FIG. 4 shows the hydraulic jack 30 of FIG. 3 in a lifted position.

Figure 5:
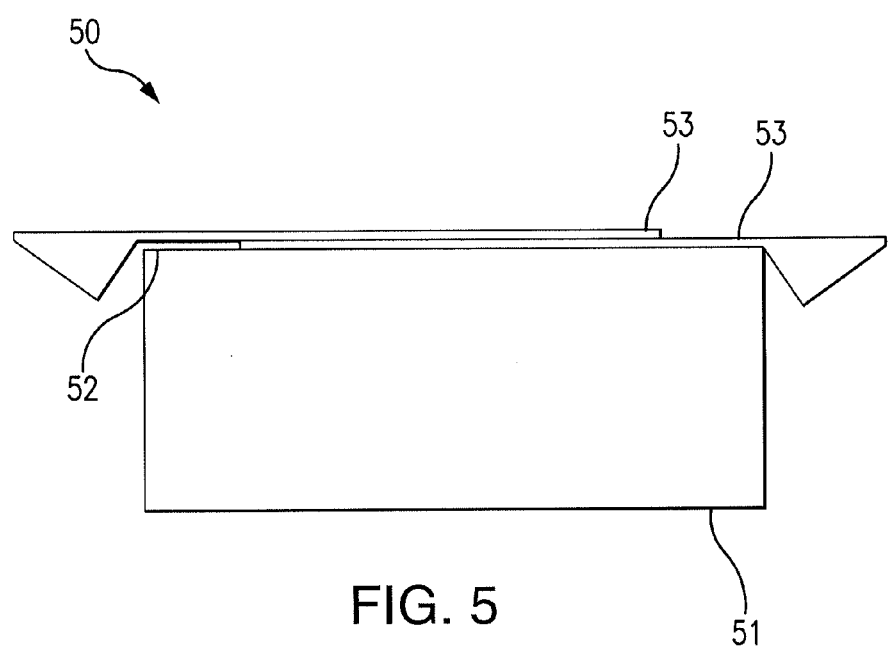
FIG. 5 depicts a jack in a stored position according to one non-limiting embodiment of the present invention.

FIG. 5 shows a jack 50 in a stored position having a base 51, a top surface 52, and removable ramps 53. The removable ramps 52 and 2003 have been removed and positioned on the top surface 52 in this embodiment. The jack can be any of the jacks disclosed herein having removable ramps.

Figure 6:
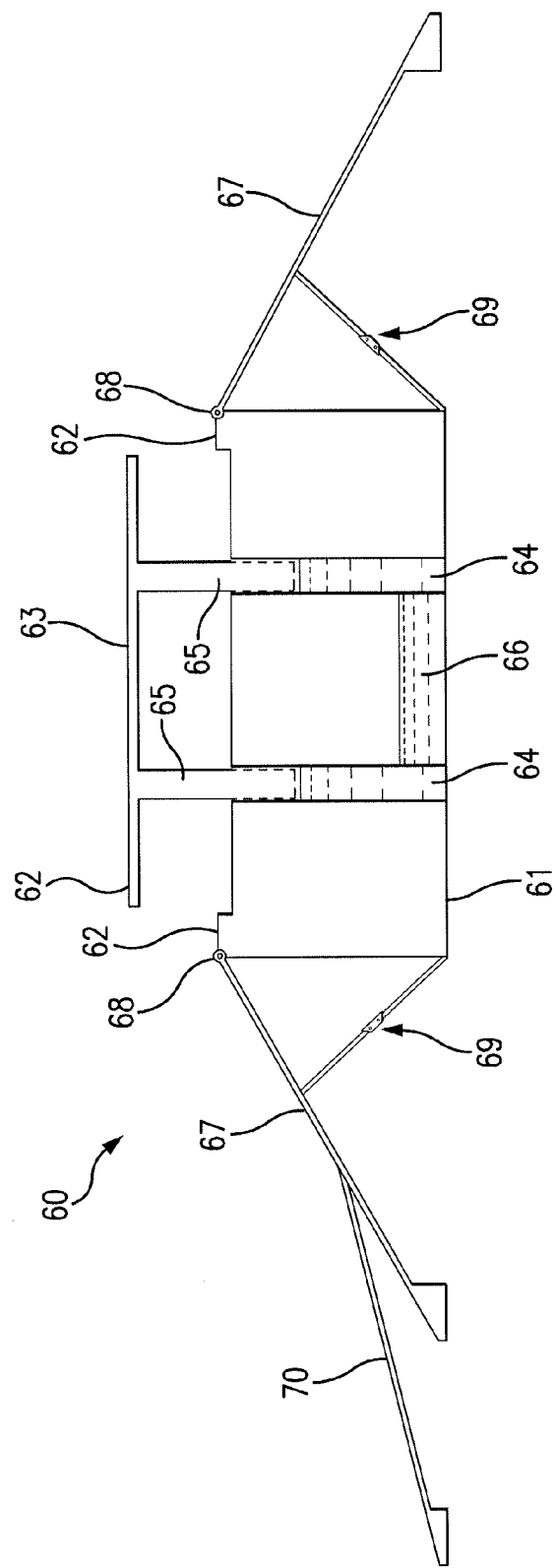
FIG. 6 depicts a jack having an additional ramp placed between a removable ramp and the ground according to one non-limiting embodiment of the present invention.

FIG. 6 shows a hydraulic jack 60 according to at least one embodiment of the invention that comprises two barrels and pistons. The jack shows a base 61 a top surface 62, including a lifting platform 63, two barrels 64, two pistons 65, a fluid cavity 66, two removable ramps 67 connected by hinges or pins 68, foldable braces 69, and an additional ramp 70. The angle of the additional ramp 70 is smaller than the angle formed between the extended plane of the top surface 62 and the extended plane of the removable ramp 67 onto which the additional ramp 70 is disposed. This permits a more gradual incline useful, for example, with low clearance vehicles.

Some embodiments of the present invention relate to methods of using the jacks disclosed herein to elevate a vehicle, such as a trailer or truck, including a tandem-axle vehicle. In some such embodiments, such methods comprise: providing a jack according to any of the aforementioned embodiments; positioning a wheel (or tire) of a tandem-axle vehicle on the top surface. In some embodiments, the lifting mechanism is not activated. For example, with a tandem-axle trailer, the tire that is not flat on a first axle can be driven onto the top surface of the jack to elevate a flat tire on the second axle (adjacent to the first axle) to permit the flat tire to be changed. In some other embodiments, the method comprises elevating at least a portion of the top surface by using a lifting mechanism, e.g., a hydraulic lifting mechanism. In such embodiments, one can also position the jack under a portion of the vehicle besides the wheel or tire, such as the vehicle frame, and elevate the vehicle with the hydraulic lifting mechanism.

The top portion or a subportion thereof (e.g., a lifting platform) can make contact with any portion of the vehicle. In some embodiments, it makes contact with the frame. In some other embodiments, it makes contact with a tire or a wheel. In some embodiments, the vehicle is a tandem-axle vehicle, but in other embodiments it is not. In embodiments where the vehicle is a tandem-axle vehicle, the invention is not limited to any particular tandem-axle vehicle. As used herein, the term "tandem-axle vehicle" at least includes, but is not limited to, flatbed trailers, livestock trailers, horse trailers, grain trailers, trucks, recreational vehicles, boat trailers, campers, military vehicles, and tractors. In some embodiments, the same vehicles can also have single-axle designs, as opposed to tandem-axle designs.

In some embodiments, the invention provides methods for elevating a tandem-axle vehicle, the method comprising: providing a jack according to any one of the above embodiments; and positioning a wheel of a first axle of the tandem-axle vehicle on the first top surface. The invention does not require that the wheel directly contact the first top surface. In some embodiments, the wheel that is situated on the first top surface is at least partially covered by a tire, which may be inflated, partially inflated, or flat. In such embodiments, the wheel of the first axle is positioned on the first top surface of the jack, while the wheel of the second axle is elevated above the ground without making contact with the jack. This allows the tire to be changed on the wheel of the second axle. In such embodiments, the second axle can either be in front of or behind the first axle.

Figure 7:
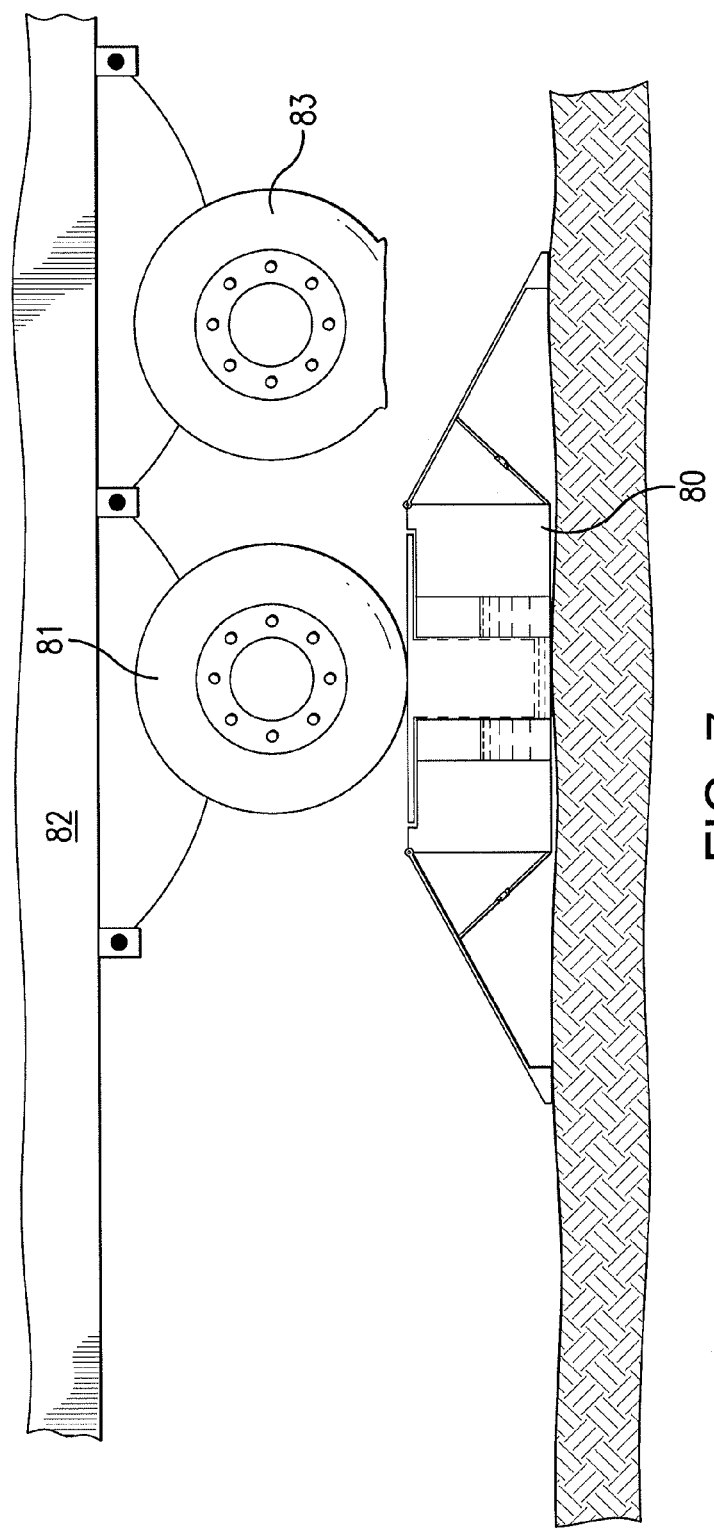
FIG. 7 depicts a jack according to one non-limiting embodiment of the present invention placed under the tire of a dual-axle vehicle.
Figure 8:
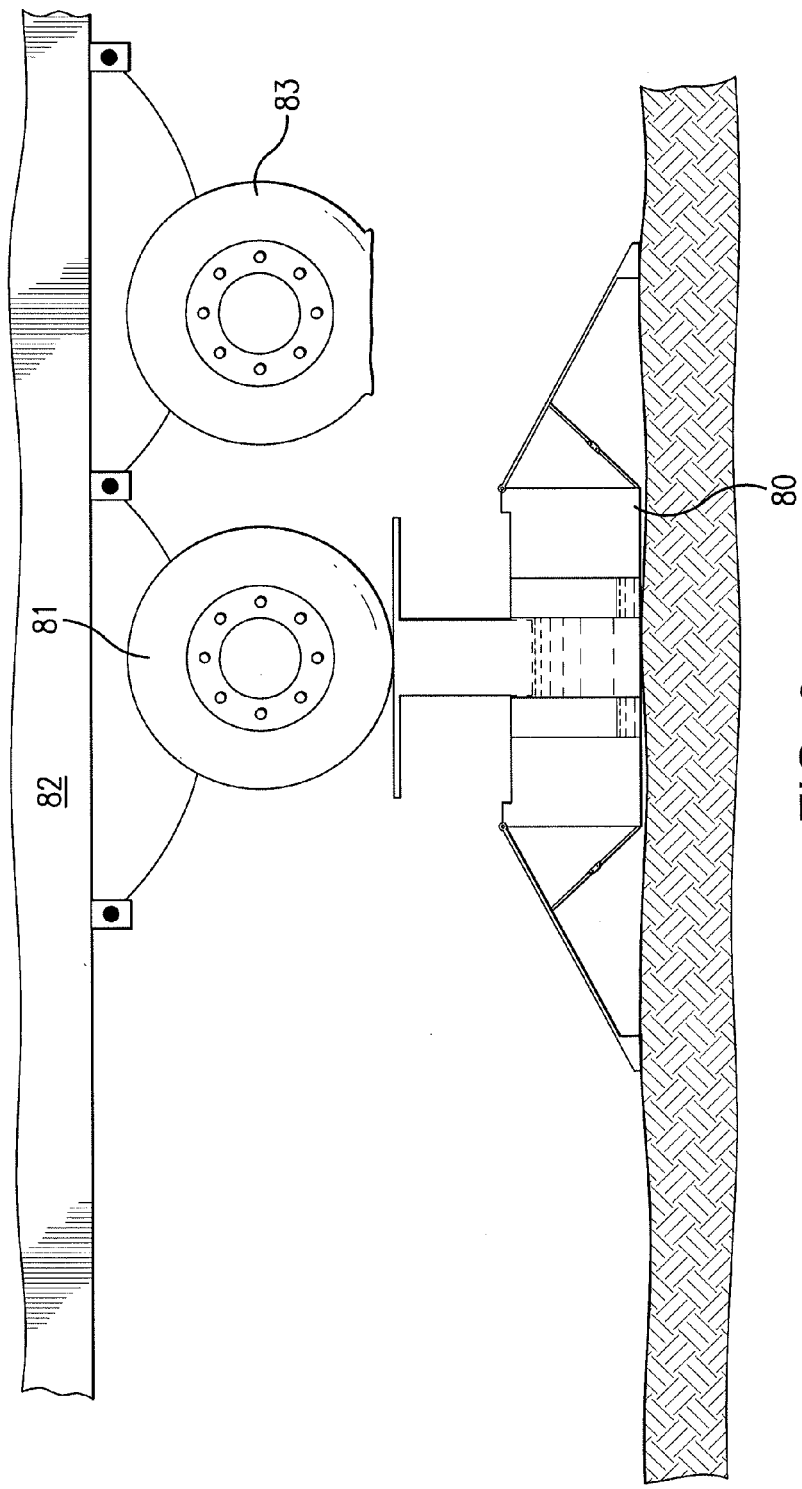
FIG. 8 depicts a jack placed according to one non-limiting embodiment of the present invention under the tire of a dual-axle vehicle in the lifted position.

FIG. 7 shows a jack 80 according to at least one embodiment of the present invention placed under a tire 81 of a dual-axle vehicle 82. A second wheel/tire 83 on an axle adjacent to the axle with the first tire 81 is elevated to permit the second wheel/tire 83 to be changed. In the scenario shown, the lifting mechanism does not need to be activated to permit the second tire 83 to be changed. FIG. 8 shows the same jack 80 in an elevated position. Depending on the configuration of the wheels/tires on the vehicle, the lifting mechanism may need to be used to change the tire as shown here. While not shown in FIG. 7 or 8, the methods illustrated therein can, in some embodiments, be performed using the spring lock device, described below, to prevent the spring assembly from equalizing and thereby maintain the second wheel/tire 83 further elevated off of the ground than otherwise.

Figure 9:
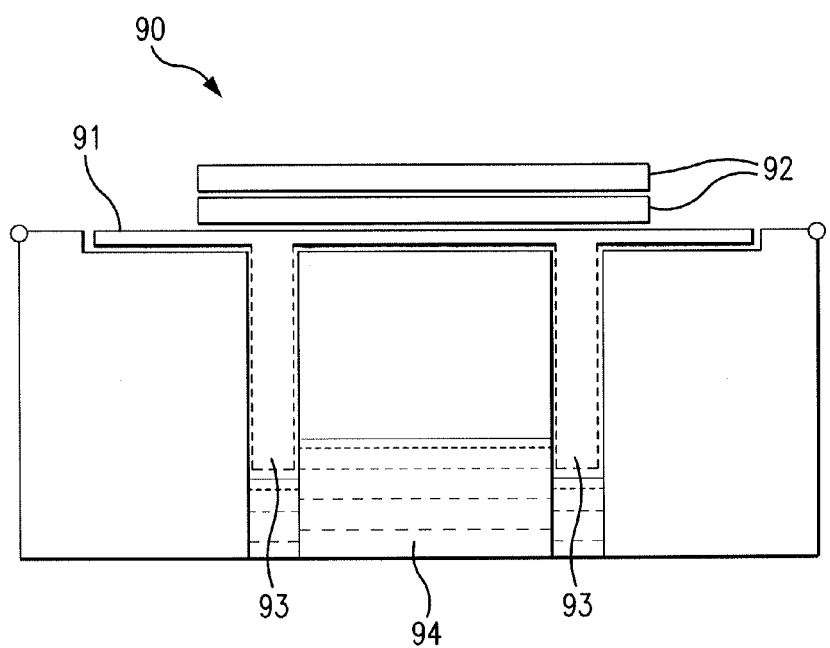
FIG. 9 depicts a jack having two support blocks placed on the lifting platform according to one non-limiting embodiment of the present invention.

FIG. 9 shows a jack according 90 to at least one embodiment where two support blocks 92 are disposed on the lifting platform 91 of the jack. The jack in this embodiment is one that utilizes two pistons 93 in conjunctions with a hydraulic oil reservoir 94. In some embodiments, one or more support blocks can serve to add elevation to the lifting platform and can also help to distribute the weight of the lifted object.

While ramps are not shown as being attached to the jack 90 in FIG. 9, it should be understood that ramps can be included on one or both sides of the jack 90 as is shown and described in connection with other embodiments of the present invention. Likewise, in some embodiments, the jack 90 of FIG. 9 can be provided as shown without any ramps. In such embodiments, the jack 90 can be positioned under the frame or other support structure of a vehicle or trailer to lift the vehicle or trailer using the frame or other support structure. Similarly, in some embodiments, the other jacks disclosed herein can also be provided without ramps to operate in a similar manner.

The present invention also includes other embodiments of jacks. Such embodiments can also be useful in connection with tandem-axle vehicles. In some embodiments, jacks comprise: (a) a base having a first end, a second end, a first side, and a second side; (b) a first ramp, which extends from the base at an angle of from 10 degrees to 70 degrees with respect to the base; (c) a second ramp, which extends from the base at an angle of from 10 degrees to 70 degrees with respect to the base; (d) a first top surface, which extends from the ends of the first and second ramps that are opposite the ends that extend from the base; and (e) a removable section that comprises a portion of the first top surface and the first ramp, which, when removed, provides a second top surface and a third ramp, wherein the third ramp extends between a first end of the first top surface and a first end of the second top surface, and wherein a second end of the second top surface extends from the first ramp; wherein the base, the first top surface and the second top surface are substantially parallel to each other; and wherein the first ramp and the third ramp are substantially parallel to each other.

Figure 10A:
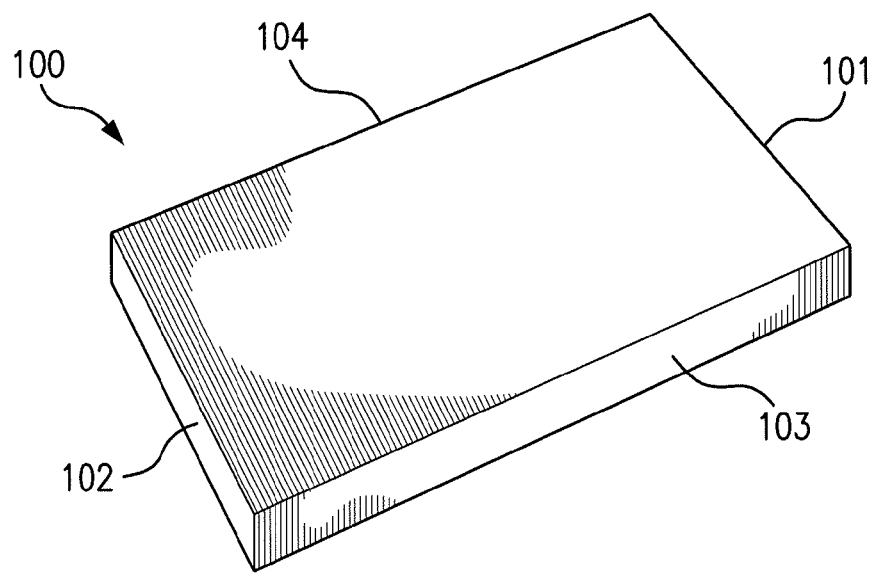
FIG. 10A depicts a solid base that can be used in some embodiments of the present invention.
Figure 10B:
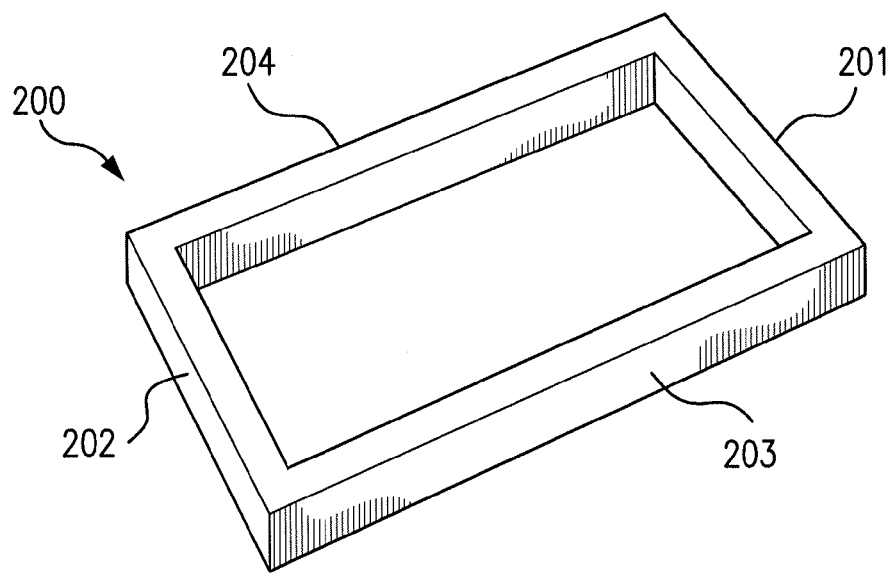
FIG. 10B depicts a base having an opening in the middle that can be used in some embodiments of the present invention.

The base can have any suitable configuration. In some embodiments, the base has at least four sides, e.g., a first end, a second end, a first side, and a second side. In some embodiments, additional sides are present. In other embodiments, four sides are present. In some embodiments, the base forms a solid surface. In other embodiments, however, the base can have one or more openings in its center. FIG. 10A shows a solid base 100 having a first end 101, a second end 102, a first side 103, and a second side 104. FIG. 10B shows a base 200 having an opening in its center, and having a first end 201, a second end 202, a first side 203, and a second side 204.

In some embodiments, the first end and the second end of the base are substantially parallel to each other, meaning that the angle formed by the extended ends within the plane of the base form an angle that is within ±10 degrees of 0 degrees, or within ±5 degrees of 0 degrees, or ±3 degrees of 0 degrees, or +1 degrees of 0 degrees. In some embodiments, the first end and the second end of the base are shorter in length than either the first side or the second side of the base. In some embodiments, the first end and the second end of the base have substantially the same length, meaning that their lengths are less than 5 cm different, or less than 3 cm different, or less than 1 cm different, or less than 0.5 cm different. In some embodiments, the first end and the second end independently have a length that ranges from 12 cm to 50 cm, or from 15 cm to 40 cm, or from 18 cm to 35 cm.

In some embodiments, the first side and the second side of the base are substantially parallel to each other, meaning that the angle formed by the extended sides within the plane of the base form an angle that is within ±10 degrees of 0 degrees, or within ±5 degrees of 0 degrees, or +3 degrees of 0 degrees, or ±1 degrees of 0 degrees. In some embodiments, the first side and the second side of the base are longer in length than either the first end or the second end of the base. In some embodiments, the first side and the second side of the base have substantially the same length, meaning that their lengths are less than 5 cm different, or less than 3 cm different, or less than 1 cm different, or less than 0.5 cm different. In some embodiments, the first side and the second side independently have a length that ranges from 50 cm to 300 cm, or from 60 cm to 250 cm, or from 70 cm to 200 cm. In some embodiments, the first side and the second side of the base are substantially perpendicular to each of the first end and the second end of the base, meaning that the angles formed by each side with each end within the plane of the base are within ±10 degrees of 90 degrees, or within ±5 degrees of 90 degrees, or ±3 degrees of 90 degrees, or ±1 degrees of 90 degrees.

In some embodiments, the sides and ends of the base are generally straight. In other embodiments, however, the sides and/or lengths do not necessarily form a line. For example, in some such embodiments, one or more of the first side, second side, first end, and second end of the base has a non-linear shape, such as a curvilinear shape.

In some embodiments, the underside of the base (i.e., the side that lies to the exterior of the jack and which generally would contact the road surface or ground) can be adapted to improve the contact between the base surface and the surface onto which the jack is placed (e.g., asphalt, concrete, dirt, grass, gravel, and the like). In some such embodiments, the underside of the base comprises one or more structures that extend outwardly from the jack. These extending structures can have any suitable shape. In some embodiments, the extending structures are cleats, which can be blunt or sharp. In some other embodiments, the extending structures are slats that lie substantially perpendicular to the direction in which the vehicle would move along the jack. Such structures can extend beyond the base of the ramp for any suitable distance. In some embodiments, the extending structures extend from 0.5 cm to 10 cm, or from 1 cm to 5 cm, or from 2 cm to 4 cm, beyond the base of the ramp. In some embodiments, a material that improves contact with the surface onto which the jack is placed can be coupled to surface of the base. For example, a rubber material can be adhered to the base, and the rubber material can include ridges, dimples, or other texture to improve the contact in some embodiments. Other materials could also be used in some embodiments.

Figure 11A:
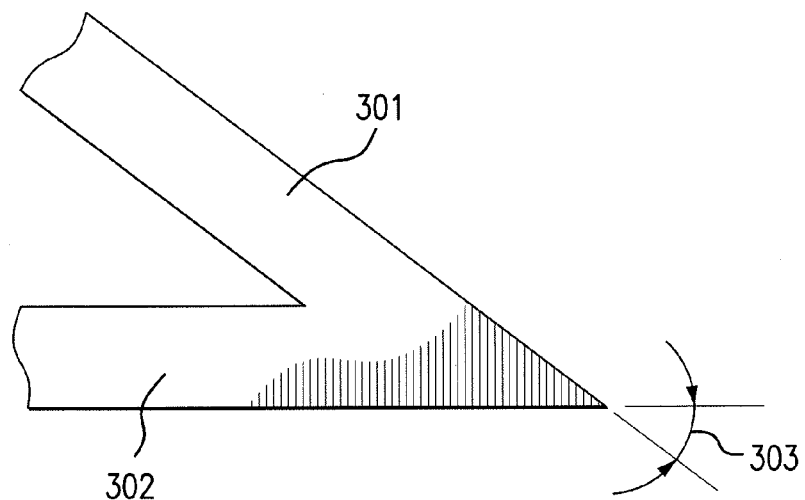
FIG. 11A depicts a ramp that extends directly to the base that can be used in some embodiments of the present invention.
Figure 11B:
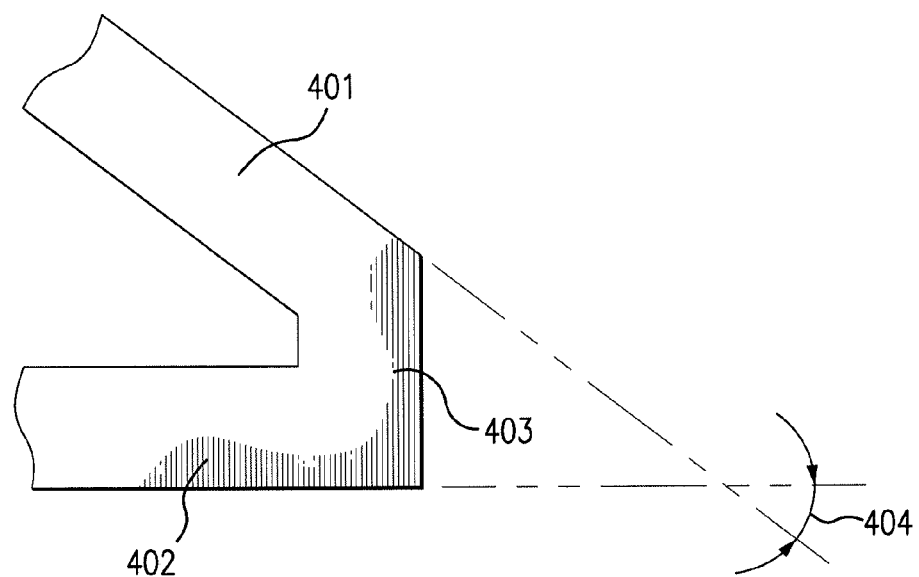
FIG. 11B depicts a ramp that extends indirectly from the base via a connecting piece that can be used in some embodiments of the present invention.

In some embodiments, the jack has a first ramp that extends from the base. In some embodiments, the first ramp is a solid surface. The ramp need not extend directly from the base. In some embodiments, the ramp and the base may be connected via a connecting piece. FIG. 11A shows an example of a ramp 301 that is directly connected to the base 302. FIG. 11B shows a ramp 401 that is indirectly connected to the base 402 via a connecting piece 403. For both embodiments, the ramp is said to extend from the base. While item 403 is identified as a connecting piece, it should be understood that connecting piece 403 is not necessarily a separate object or item as ramp 401, base 402, and connecting piece 403 could be constructed from the same piece of material. The ramp can have any suitable angle with respect to the base. FIGS. 11A and 11B show the angle 303, 404 that is referred to. In some embodiments, this angle ranges from 10 to 70 degrees, or from 15 to 60 degrees, or from 20 to 50 degrees, or from 25 to 40 degrees.

The first ramp can have any suitable width. In some embodiments, the width of the first ramp can be determined based upon the desired tire or wheel width that the jack is intended to accommodate (e.g., a width that is somewhat wider than the maximum width of the tire or wheel for which the jack is intended). In some embodiments, the first ramp has a width that is substantially the same as the length of the end of the base closest to the point from which it extends, meaning that the two distances are less than 5 cm different, or less than 3 cm different, or less than 1 cm different, or less than 0.5 cm different.

The first ramp can have any suitable length. Suitable lengths may depend on various factors, including but not limited to the length of the sides of the base, the angle formed by the first ramp with respect to the base, and the diameter of the tire or wheel of the vehicle for which the jack is intended to accommodate. In some embodiments, the first ramp has a length that is less than the lengths of either the first or second sides of the base. In some embodiments, the first ramp has a length that ranges from 20 cm to 250 cm, or from 25 to 200 cm, or from 30 to 150 cm, or from 35 to 100 cm.

In some embodiments, the jack has a second ramp that extends from the base. In some embodiments, the second ramp is a solid surface. The ramp need not extend directly from the base. In some embodiments, the ramp and the base may be connected via a connecting piece. As noted above, FIGS. 11A and 11B illustrate embodiments of ramps 301, 401 that are directly connected to a base 302 (FIG. 11A) and indirectly connected to a base 401 via a connecting piece 403 (FIG. 11B). For both embodiments, the ramp is said to extend from the base. The ramp can have any suitable angle with respect to the base. FIGS. 11A and 11B show the angle

303, 404 that is referred to. In some embodiments, this angle ranges from 10 to 70 degrees, or from 15 to 60 degrees, or from 20 to 50 degrees, or from 25 to 40 degrees.

The second ramp can have any suitable width. In some embodiments, the width of the second ramp can be determined based upon the desired tire or wheel width that the jack is intended to accommodate (e.g., a width that is somewhat wider than the maximum width of the tire or wheel for which the jack is intended). In some embodiments, the second ramp has a width that is substantially the same as the length of the end of the base closest to the point from which it extends, meaning that the two distances are less than 5 cm different, or less than 3 cm different, or less than 1 cm different, or less than 0.5 cm different.

The second ramp can have any suitable length. Suitable lengths may depend on various factors, including but not limited to the length of the sides of the base, the angle formed by the second ramp with respect to the base, and the diameter of the tire or wheel of the vehicle for which the jack is intended to accommodate. In some embodiments, the second ramp has a length that is less than the lengths of either the first or second sides of the base. In some embodiments, the second ramp has a length that ranges from 20 cm to 250 cm, or from 25 to 200 cm, or from 30 to 150 cm, or from 35 to 100 cm. In some embodiments, the first ramp and the second ramp have lengths that are different from each other by no more than 20 cm, or no more than 15 cm, or no more than 10 cm, or no more than 5 cm, or no more than 2 cm, or no more than 1 cm.

The surface of either of the two ramps can have any suitable finish. In some embodiments, the surfaces are smooth. In other embodiments, the ramp surfaces are at least partially coated with an abrasive surface that, for example, increases the friction between the ramp surface and objects (e.g., a tire) that may be placed on the ramp surface. In some other embodiments, the ramp surfaces do not necessarily have an abrasive coating, but at least part of the ramp surface itself is formed so as to have a non-smooth or abrasive texture.

Figure 12:
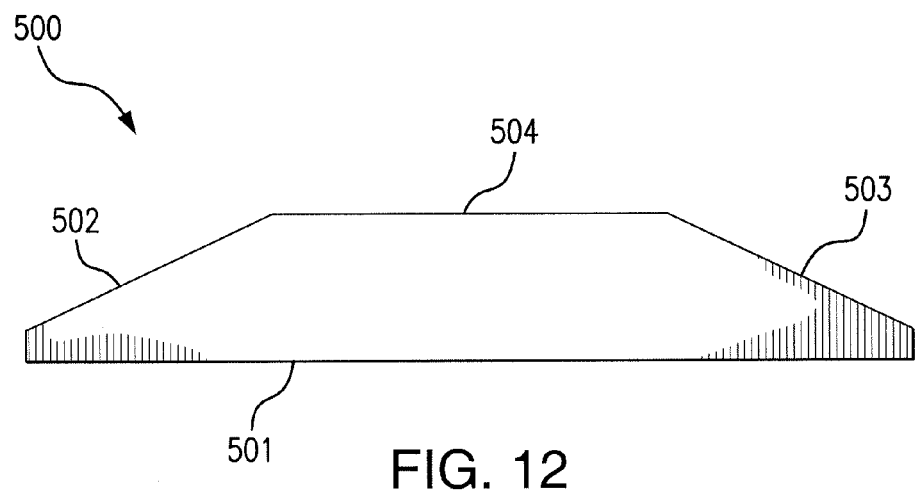
FIG. 12 depicts a jack having a base, two ramps, and a top surface according to one non-limiting embodiment of the present invention.

In some embodiments, the jack comprises a first top surface, which extends from the ends of the first and second ramps that are opposite the ends that extend from the base. In some embodiments, the top surface is a solid surface. In some embodiments, the top surface, the first ramp, and the second ramp form a continuous surface that extends from the base of the jack. FIG. 12 shows an illustration of a jack 500 having a base 501, a first ramp 502, a second ramp 503, and a first top surface 504.

In some embodiments, the first top surface is substantially parallel to the base, meaning that the angle formed from the extended line of the edges of the first top surface and the base is within ±10 degrees of 0 degrees, or within ±5 degrees of 0 degrees, or ±3 degrees of 0 degrees, or ±1 degrees of 0 degrees. The first top surface can have any suitable height above the base. In some embodiments, the distance between the base and the first top surface ranges from 15 to 60 cm, or from 20 to 50 cm, or from 25 to 40 cm.

The first top surface can have any suitable width. In some embodiments, the first top surface has a width that is substantially the same as the length of either end of the base, meaning that the two distances are less than 5 cm different, or less than 3 cm different, or less than 1 cm different, or less than 0.5 cm different. In some embodiments, the width of the first top surface can be determined based upon the desired tire or wheel width that the jack is intended to accommodate (e.g., a width that is somewhat wider than the maximum width of the tire or wheel for which the jack is intended).

The first top surface can have any suitable length. Suitable lengths may depend on various factors, including but not limited to the length of the sides of the base, the length of the ramps, the angles formed by the ramps with respect to the base, and the diameter of the tire or wheel of the vehicle for which the jack is intended to accommodate. In some embodiments, the first top surface has a length that is less than the lengths of either the first or second sides of the base. In some embodiments, the first top surface has a length that ranges from 20 cm to 250 cm, or from 25 to 200 cm, or from 30 to 150 cm, or from 35 to 100 cm.

The surface of the first top surface can have any suitable finish. In some embodiments, the surface is smooth. In other embodiments, the surface is at least partially coated with an abrasive surface that, for example, increases the friction between the surface and objects (e.g., a tire) that may be placed on the surface. In some other embodiments, the ramp surface does not necessarily have an abrasive coating, but at least part of the ramp surface itself is formed so as to have a non-smooth or abrasive texture.

Figure 13:
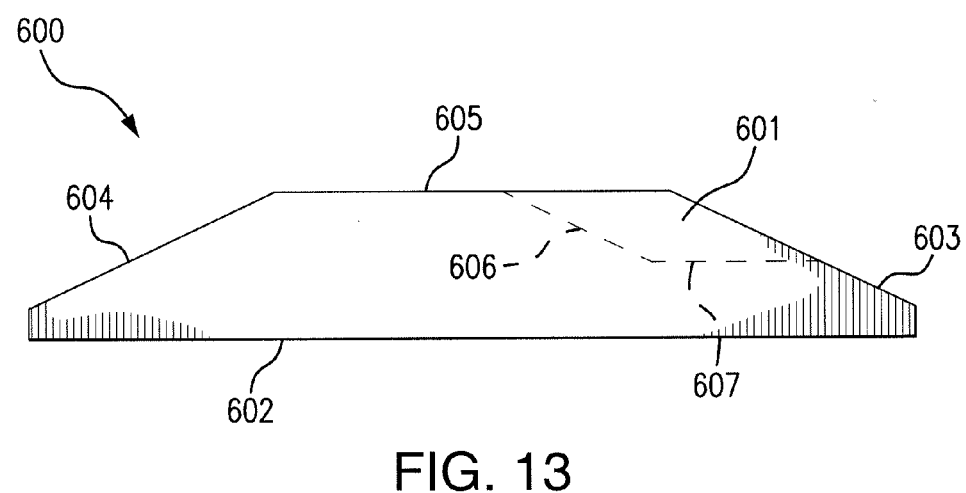
FIG. 13 depicts a jack having a removable section according to one non-limiting embodiment of the present invention.

In some embodiments, the jack further includes a removable section. In some such embodiments, the removable section comprises a portion of the first top surface and the first ramp. When this removable section is removed, it provides a second top surface and a third ramp, wherein the third ramp extends between a first end of the first top surface and a first end of the second top surface, and wherein a second end of the second top surface extends from the first ramp. FIG. 13 shows an example of a jack 600 having such a removable section 601. FIG. 13 also shows the base 602, the first ramp 603, the second ramp 604, the first top surface 605, the third ramp 606, and the second top surface 607.

Figure 14:
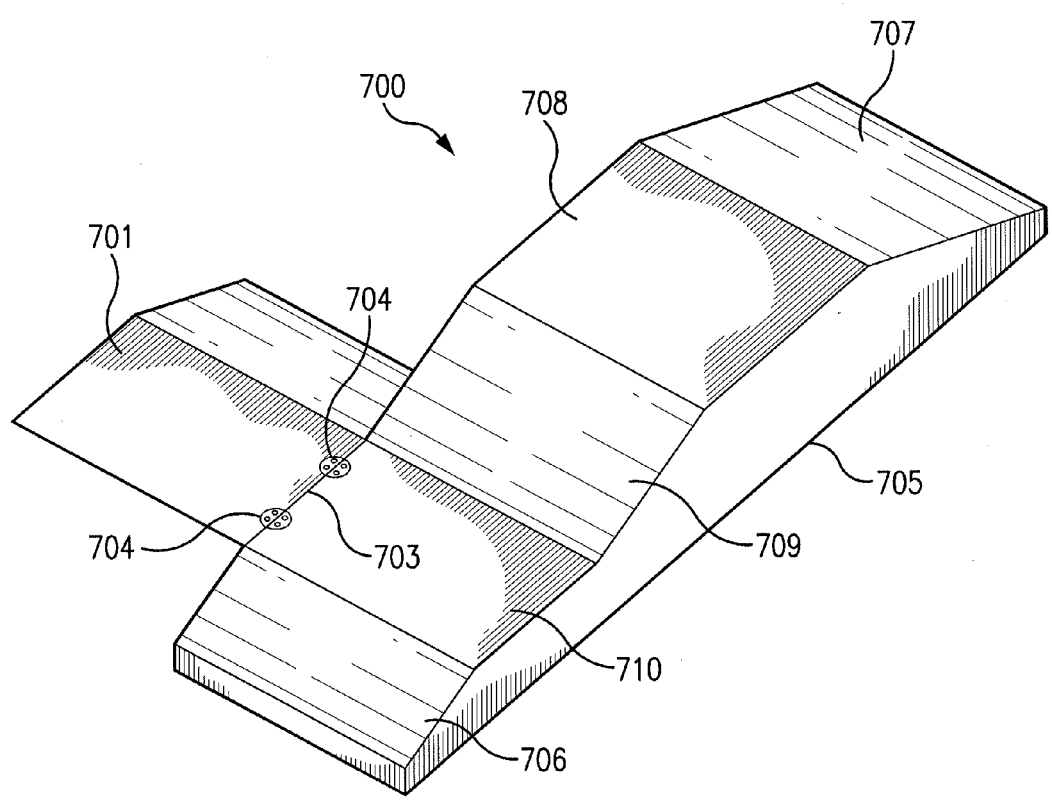
FIG. 14 depicts a jack having a removable section hinged to the body of the jack according to one non-limiting embodiment of the present invention.

The removable section is removable by any suitable means. In some embodiments, the removable section is fitted into place. In other embodiments, the removable section is temporarily secured in place by some suitable means, such as a weak adhesive, Velcro, bolts, screws, and the like. In some embodiments, the removable section is hinged to the jack, e.g., at the edge of the second top surface. Thus, even though the section may be removable, it may also still be connected to the remainder of the jack via hinges. FIG. 14 shows a removable section 701 that is hinged to the jack 700 at the edge of the second top surface 703 via hinges 704. In such embodiments, any suitable number of hinges can be used, for example, one, two, three, four, etc. Moreover, any suitable type of hinge can be used. FIG. 14, also shows the base 705, the first ramp 706, the second ramp 707, the first top surface 708, the third ramp 709, and the second top surface 710.

The removable section allows the jack to be adapted for use with various tandem-axle trailers. For example, some trailers may have a frame design that would make contact with the jack if the removable section were not removed. By removing the removable section, the trailer can move up to the first top surface in a more gradual manner, thereby reducing the likelihood that some portion of the trailer, such as the fender, steps, or frame, makes contact with the jack. Some vehicles (e.g., certain livestock trailers or flatbed trailers) may be designed such that the frame, steps, or part of the fender has a relatively small amount of ground clearance, especially when the trailer is loaded. In some such instances, when a conventional ramp jack is used, the frame, steps, or fender can make contact with the ramp before the tire (e.g., a flat tire) can reach the top of the ramp. By providing a jack having the features described herein, it substantially decreases the likelihood that a low-clearance vehicle's frame, steps, or fender will contact the ramp before the tire reaches the highest point on the jack.

In embodiments where the removable section can be entirely disengaged from the jack, the removable section can be put to other suitable uses, including but not limited to use as a chock or a stop, e.g., a chock or a stop that can be positioned immediately adjacent to a trailer or truck tire to limit or prevent rolling.

In embodiments having a removable section, the removable section can form at least a portion of the first top surface in some embodiments. In some embodiments, the removable section includes from 20% to 80%, or from 25% to 70%, or from 30% to 60% of the length of the first top surface. The removable section can also form at least a portion of the first ramp. In some embodiments, the removable section includes from 20% to 80%, or from 25% to 70%, or from 30% to 60% of the length of the first ramp.

The third ramp, when exposed, for example, by moving the removable section, extends from, and connects, the first and second top surfaces. The third ramp can have any suitable angle with respect to the other features of the jack. In some embodiments, the third ramp is substantially parallel to the first ramp, meaning that the angle formed from the extended line of the edges of the first ramp and the third ramp is within ±10 degrees of 0 degrees, or within ±5 degrees of 0 degrees, or ±3 degrees of 0 degrees, or ±1 degrees of 0 degrees.

The third ramp can have any suitable width. In some embodiments, the width of the third ramp can be determined based upon the desired tire or wheel width that the jack is intended to accommodate (e.g., a width that is somewhat wider than the maximum width of the tire or wheel for which the jack is intended). In some embodiments, the third ramp has a width that is substantially the same as the length of the second top surface, meaning that the two distances are less than 5 cm different, or less than 3 cm different, or less than 1 cm different, or less than 0.5 cm different.

The third ramp can have any suitable length. Suitable lengths may depend on various factors, including but not limited to the length of the sides of the base and the angle formed by the second ramp with respect to the base. In some embodiments, the third ramp has a length that is less than the length of the second ramp. In some embodiments, the third ramp has a length that ranges from 10 cm to 180 cm, or from 12 to 100 cm, or from 15 to 50 cm.

The surface of the third ramp can have any suitable finish. In some embodiments, the surface is smooth. In other embodiments, the ramp surface is at least partially coated with an abrasive surface that, for example, increases the friction between the ramp surface and objects (e.g., a tire) that may be placed on the ramp surface. In some other embodiments, the ramp surface does not necessarily have an abrasive coating, but at least part of the ramp surface itself is formed so as to have a non-smooth or abrasive texture.

The second top surface extends between the first and third ramps. In some embodiments, the second top surface is a solid surface.

In some embodiments, the second top surface is substantially parallel to the base, meaning that the angle formed from the extended line of the edges of the second top surface and the base is within ±10 degrees of 0 degrees, or within ±5 degrees of 0 degrees, or ±3 degrees of 0 degrees, or ±1 degrees of 0 degrees. The second top surface can have any suitable height above the base. In some embodiments, the distance between the base and the first top surface ranges from 8 to 50 cm, or from 10 to 40 cm, or from 12 to 30 cm.

The second top surface can have any suitable width. In some embodiments, the width of the second top surface can be determined based upon the desired tire or wheel width that the jack is intended to accommodate (e.g., a width that is somewhat wider than the maximum width of the tire or wheel for which the jack is intended). In some embodiments, the second top surface has a width that is substantially the same as the length of either end of the base, meaning that the two distances are less than 5 cm different, or less than 3 cm different, or less than 1 cm different, or less than 0.5 cm different.

The second top surface can have any suitable length. Suitable lengths may depend on various factors, including but not limited to the length of the sides of the base, the length of the ramps, the angles formed by the ramps with respect to the base, and the diameter of the tire or wheel of the vehicle for which the jack is intended to accommodate. In some embodiments, the first top surface has a length that ranges from 10 cm to 180 cm, or from 12 to 100 cm, or from 15 to 50 cm.

The surface of the second top surface can have any suitable finish. In some embodiments, the surface is smooth. In other embodiments, the surface is at least partially coated with an abrasive surface that, for example, increases the friction between the surface and objects (e.g., a tire) that may be placed on the surface. In some other embodiments, the ramp surface does not necessarily have an abrasive coating, but at least part of the ramp surface itself is formed so as to have a non-smooth or abrasive texture.

The jack can also include various features to provide structural support, for example, to allow the ramps and top surfaces to bear the weight of a vehicle. The invention is not limited to any particular means of providing such support. In some embodiments, support is provided via side enclosures that provide support for the one or more of the ramps and top surfaces along their edges. In some embodiments, reinforcing rods can be placed in the interior portions of the jack. In some embodiments, the jack can be a solid material. In some embodiments, portions of the jack can be solid to provide support, and other portions can be hollow.

The jack can be made of any suitable material or combination of materials, so long as the materials provide sufficient strength to support a tandem-axle vehicle or other vehicle for which the jack is desired to be used. Suitable materials include, but are not limited to: wood, such as hardwood; metals, such as iron and alloys thereof, and steel; polymers and various polymeric composites, such as fiberglass-polymer composites.

Figure 15:
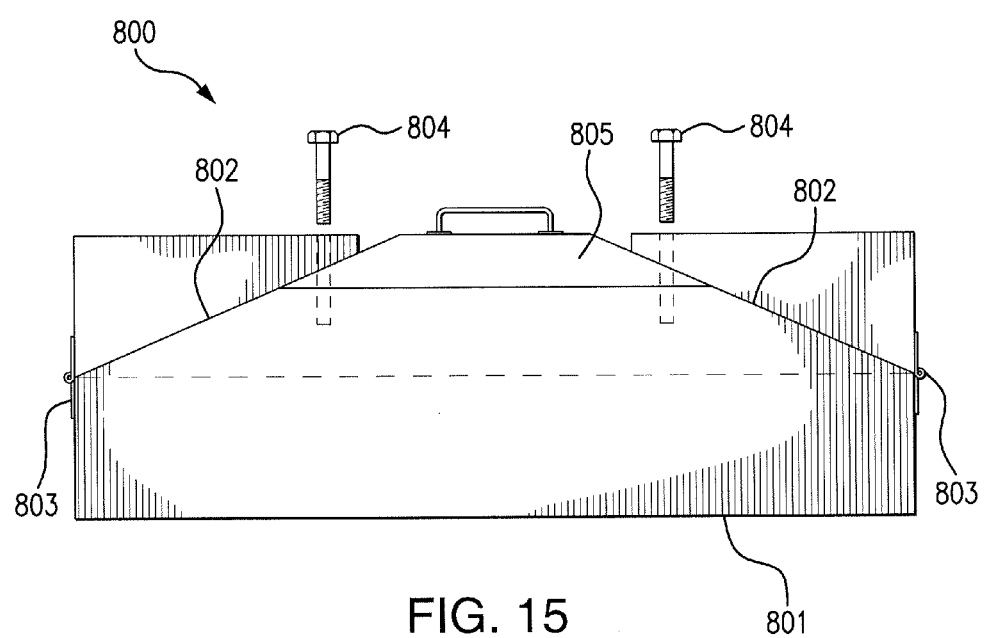
FIG. 15 depicts a ramp that can be folded up for storage according to one non-limiting embodiment of the present invention.

The jack may also include various features that assist with carrying and storage. For example, in some embodiments, the jack can include one or more handles. Further, in some embodiments, the first and second ramps can fold inwardly to minimize the space required for storage. FIG. 15 shows the base 801, two ramps 802, and hinges 803 in the base that allow part of the jack 800 to be folded up to minimize the footprint of the jack during storage. In some such embodiments, the folded-up portions can be temporarily held in place by a suitable means. This can be done by any suitable means, such as Velcro, latches, screws, etc. FIG. 15 shows the use of threaded bolts 804 to serve in this way. As noted above, in some embodiments, the removable portion can be detached from the jack. In some such embodiments, the jack is folded up but the removable portion is removed, e.g., to be used as a stop or chock for a vehicle. In some further such embodiments, a handle can be incorporated into the jack.

This can be done in any suitable manner. FIG. 15 shows one embodiment thereof, where a handle portion 805 is affixed to the top of the jack 800.

Figure 16A:
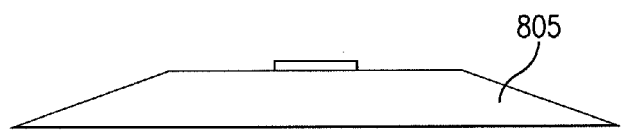
FIG. 16A depicts a handle portion that is detached from the jack according to one non-limiting embodiment of the present invention.
Figure 16B:
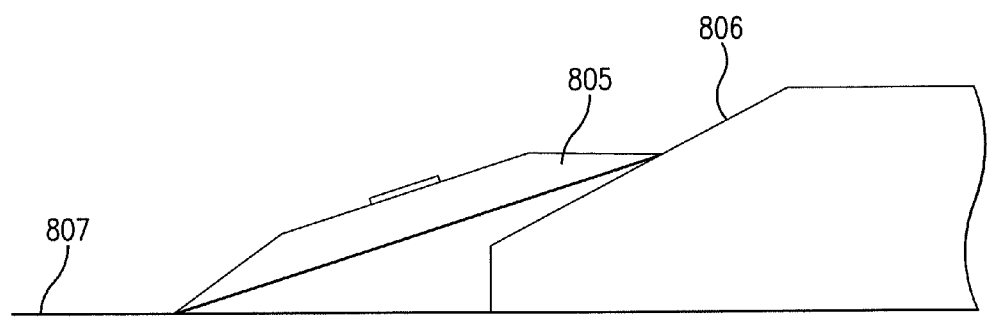
FIG. 16B depicts the use of a handle portion to form an additional ramp between one of the existing ramps and the ground according to one non-limiting embodiment of the present invention.

In some embodiments, the handle portion is entirely detachable from the jack. Once removed, the handle portion can be used for any suitable purpose. In some embodiments, the handle portion can be placed so that it creates an additional ramp between one of the ramp surfaces and the ground surface. FIG. 16A shows the handle portion 805, and FIG. 16B shows the placement of the handle portion 805 so that it creates an additional ramp between a ramp 806 and the ground 807. In other embodiments, the handle portion can be placed in a similar way to form an additional ramp between another of the jack's ramps and the ground. Either the top side or the bottom side of the handle portion can be used for this purpose. In some other embodiments, the handle portion can be placed on a top surface of the jack, such that the handle portion serves as a top surface for the jack.

In some embodiments, the first top surface or a portion of the first top portion can be attached from beneath to a lifting mechanism, which can elevate the first top or a portion thereof to a height above the rest of the jack. Any suitable lifting mechanism can be used. For example, in some embodiments, a crank lifting mechanism can be used, such as a scissor jack. In some other embodiments, a lever-based lifting mechanism can be used. In some other embodiments, a hydraulic lifting mechanism can be used, such as a hydraulic lifting mechanism having one, two, three, four, five, six, or more barrels and pistons, and corresponding fluid cavities and pumps, or even a bottle jack. In some embodiments, the jack includes one or more hollow cavities beneath the first top surface, which can house the lifting mechanism.

The present invention also includes other embodiments of jacks that be used, for example, in connection with tandem-axle vehicles. In some embodiments, such jacks comprise: (a) a base having a first end, a second end, a first side, and a second side; (b) a first ramp, which extends from the base at an angle of from 10 degrees to 70 degrees with respect to the base; (c) a second ramp, which extends from the base at an angle of from 10 degrees to 70 degrees with respect to the base; (d) a first top surface, which extends from the end of the second ramp that is opposite the end that extends from the base; and (e) a second top surface having a first end that extends from the first ramp; and (f) a third ramp, which extends between a first end of the first top surface and a second end of the second top surface; wherein the base, the first top surface and the second top surface are substantially parallel to each other; and wherein the first ramp and the third ramp are substantially parallel to each other. In some such embodiments, the jack has a removable section (described above), where the removable section has been removed.

The base can have any suitable configuration. In some embodiments, the base has at least four sides, e.g., a first end, a second end, a first side, and a second side. In some embodiments, additional sides are present. In other embodiments, four sides are present. In some embodiments, the base is forms a solid surface. In other embodiments, however, the base can have openings in its center. FIG. 10A and FIG. 10B, as discussed above, provide illustrative examples of bases of ramps according to some embodiments of the present invention.

In some embodiments, the first end and the second end of the base are substantially parallel to each other, meaning that the angle formed by the extended ends within the plane of the base form an angle that is within ±10 degrees of 0 degrees, or within ±5 degrees of 0 degrees, or ±3 degrees of 0 degrees, or ±1 degrees of 0 degrees. In some embodiments, the first end and the second end of the base are shorter in length than either the first side or the second side of the base. In some embodiments, the first end and the second end of the base have substantially the same length, meaning that their lengths are less than 5 cm different, or less than 3 cm different, or less than 1 cm different, or less than 0.5 cm different. In some embodiments, the first end and the second end independently have a length that ranges from 12 cm to 50 cm, or from 15 cm to 40 cm, or from 18 cm to 35 cm.

In some embodiments, the first side and the second side of the base are substantially parallel to each other, meaning that the angle formed by the extended sides within the plane of the base form an angle that is within ±10 degrees of 0 degrees, or within ±5 degrees of 0 degrees, or ±3 degrees of 0 degrees, or ±1 degrees of 0 degrees. In some embodiments, the first side and the second side of the base are longer in length than either the first end or the second end of the base. In some embodiments, the first side and the second side of the base have substantially the same length, meaning that their lengths are less than 5 cm different, or less than 3 cm different, or less than 1 cm different, or less than 0.5 cm different. In some embodiments, the first side and the second side independently have a length that ranges from 50 cm to 300 cm, or from 60 cm to 250 cm, or from 70 cm to 200 cm. In some embodiments, the first side and the second side of the base are substantially perpendicular to each of the first end and the second end of the base, meaning that the angles formed by each side with each end within the plane of the base are within ±10 degrees of 90 degrees, or within ±5 degrees of 90 degrees, or ±3 degrees of 90 degrees, or ±1 degrees of 90 degrees.

In some embodiments, the sides and ends of the base are generally straight. In other embodiments, however, the sides and/or lengths do not necessarily form a line. For example, in some such embodiments, one or more of the first side, second side, first end, and second end of the base has a non-linear shape, such as a curvilinear shape.

In some embodiments, the jack has a first ramp that extends from the base. In some embodiments, the first ramp is a solid surface. The ramp need not extend directly from the base. In some embodiments, the ramp and the base may be connected via a connecting piece. As noted above, FIGS. 11A and 11B illustrate embodiments of ramps 301,401 that are directly connected to a base 302 (FIG. 11A) and indirectly connected to a base 401 via a connecting piece 403 (FIG. 11B). For both embodiments, the ramp is said to extend from the base. The ramp can have any suitable angle with respect to the base. FIGS. 11A and 11B show the angle 303, 404 that is referred to. In some embodiments, this angle ranges from 10 to 70 degrees, or from 15 to 60 degrees, or from 20 to 50 degrees, or from 25 to 40 degrees.

The first ramp can have any suitable width. In some embodiments, the first ramp has a width that is substantially the same as the length of the end of the base closest to the point from which it extends, meaning that the two distances are less than 5 cm different, or less than 3 cm different, or less than 1 cm different, or less than 0.5 cm different.

The first ramp can have any suitable length. Suitable lengths may depend on various factors, including but not limited to the length of the sides of the base and the angle formed by the first ramp with respect to the base. In some embodiments, the first ramp has a length that is less than the lengths of either the first or second sides of the base. In some embodiments, the first ramp has a length that ranges from 10 cm to 180 cm, or from 12 to 100 cm, or from 15 to 50 cm.

In some embodiments, the jack has a second ramp that extends from the base. In some embodiments, the second ramp is a solid surface. The ramp need not extend directly from the base. In some embodiments, the ramp and the base may be connected via a connecting piece. As noted above, FIGS. 11A and 11B illustrate embodiments of ramps 301, 401 that are directly connected to a base 302 (FIG. 11A) and indirectly connected to a base 401 via a connecting piece 403 (FIG. 11B). For both embodiments, the ramp is said to extend from the base. The ramp can have any suitable angle with respect to the base. FIGS. 11A and 11B show the angle 303, 404 that is referred to. In some embodiments, this angle ranges from 10 to 70 degrees, or from 15 to 60 degrees, or from 20 to 50 degrees, or from 25 to 40 degrees.

The second ramp can have any suitable width. In some embodiments, the second ramp has a width that is substantially the same as the length of the end of the base closest to the point from which it extends, meaning that the two distances are less than 5 cm different, or less than 3 cm different, or less than 1 cm different, or less than 0.5 cm different.

The second ramp can have any suitable length. Suitable lengths may depend on various factors, including but not limited to the length of the sides of the base and the angle formed by the second ramp with respect to the base. In some embodiments, the second ramp has a length that is less than the lengths of either the first or second sides of the base. In some embodiments, the second ramp has a length that ranges from 20 cm to 250 cm, or from 25 to 200 cm, or from 30 to 150 cm, or from 35 to 100 cm. In some embodiments, the first ramp and the second ramp have lengths that are different from each other by no more than 20 cm, or no more than 15 cm, or no more than 10 cm, or no more than 5 cm, or no more than 2 cm, or no more than 1 cm.

In some embodiments, the jack has a third ramp. The third ramp extends from the first and second top surfaces (which are described in more detail below). The third ramp can have any suitable angle with respect to the other features of the jack. In some embodiments, the third ramp is substantially parallel to the first ramp, meaning that the angle formed from the extended line of the edges of the first ramp and the third ramp is within ±10 degrees of 0 degrees, or within ±5 degrees of 0 degrees, or ±3 degrees of 0 degrees, or ±1 degrees of 0 degrees.

The third ramp can have any suitable width. In some embodiments, the third ramp has a width that is substantially the same as the length of the end of the base closest to the point from which it extends, meaning that the two distances are less than 5 cm different, or less than 3 cm different, or less than 1 cm different, or less than 0.5 cm different.

The third ramp can have any suitable length. Suitable lengths may depend on various factors, including but not limited to the length of the sides of the base and the angle formed by the second ramp with respect to the base. In some embodiments, the third ramp has a length that is less than the length of the second ramp. In some embodiments, the third ramp has a length that ranges from 10 cm to 180 cm, or from 12 to 100 cm, or from 15 to 50 cm.

The surfaces of any of the three ramps can have any suitable finishing. In some embodiments, the surfaces are smooth. In other embodiments, the ramp surfaces are at least partially coated with an abrasive surface that, for example, increases the friction between the ramp surface and objects (e.g., a tire) that may be placed on the ramp surface. In some other embodiments, the ramp surfaces do not necessarily have an abrasive coating, but at least part of the ramp surface itself is formed so as to have a non-smooth or abrasive texture.

In some embodiments, the jack comprises a first top surface, which extends from the ends of the second and third ramps that are opposite the end where the second ramp extends from the base and opposite the end where the third ramp extends from the second top surface. In some embodiments, the first top surface is a solid surface.

In some embodiments, the first top surface is substantially parallel to the base, meaning that the angle formed from the extended line of the edges of the first top surface and the base is within ±10 degrees of 0 degrees, or within ±5 degrees of 0 degrees, or ±3 degrees of 0 degrees, or ±1 degrees of 0 degrees. The first top surface can have any suitable height above the base. In some embodiments, the distance between the base and the first top surface ranges from 15 to 60 cm, or from 20 to 50 cm, or from 25 to 40 cm.

The first top surface can have any suitable width. In some embodiments, the first top surface has a width that is substantially the same as the length of either end of the base, meaning that the two distances are less than 5 cm different, or less than 3 cm different, or less than 1 cm different, or less than 0.5 cm different.

The first top surface can have any suitable length. Suitable lengths may depend on various factors, including but not limited to the length of the sides of the base, the length of the ramps, and the angles formed by the ramps with respect to the base. In some embodiments, the first top surface has a length that is less than the lengths of either the first or second sides of the base. In some embodiments, the first top surface has a length that ranges from 10 cm to 180 cm, or from 12 to 100 cm, or from 15 to 50 cm.

In some embodiments, the jack comprises a second top surface. The second top surface extends from the first and third ramps. In some embodiments, the second top surface is a solid surface.

In some embodiments, the second top surface is substantially parallel to the base, meaning that the angle formed from the extended line of the edges of the second top surface and the base is within ±10 degrees of 0 degrees, or within ±5 degrees of 0 degrees, or ±3 degrees of 0 degrees, or ±1 degrees of 0 degrees. The second top surface can have any suitable height above the base. In some embodiments, the distance between the base and the first top surface ranges from 8 to 50 cm, or from 10 to 40 cm, or from 12 to 30 cm.

The second top surface can have any suitable width. In some embodiments, the second top surface has a width that is substantially the same as the length of either end of the base, meaning that the two distances are less than 5 cm different, or less than 3 cm different, or less than 1 cm different, or less than 0.5 cm different.

The second top surface can have any suitable length. Suitable lengths may depend on various factors, including but not limited to the length of the sides of the base, the length of the ramps, and the angles formed by the ramps with respect to the base. In some embodiments, the first top surface has a length that ranges from 10 cm to 180 cm, or from 12 to 100 cm, or from 15 to 50 cm.

The surfaces of either of the top surfaces can have any suitable finishing. In some embodiments, the surface is smooth. In other embodiments, the surface is at least partially coated with an abrasive surface that, for example, increases the friction between the surface and objects (e.g., a tire) that may be placed on the surface. In some other embodiments, the ramp surfaces do not necessarily have an abrasive coating, but at least part of the ramp surface itself is formed so as to have a non-smooth or abrasive texture.

Figure 17:
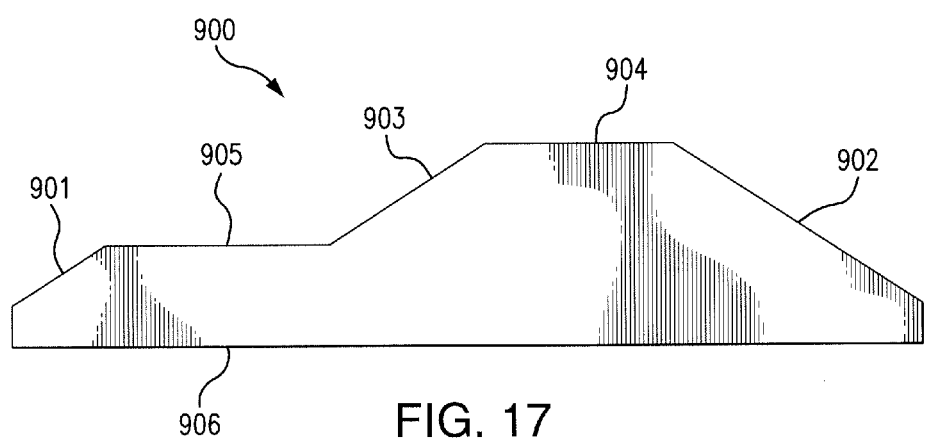
FIG. 17 depicts a jack having three ramps and two top surfaces according to one non-limiting embodiment of the present invention.

In some embodiments, the first ramp, second ramp, third ramp, first top surface, and second top surface combine to form a continuous surface that sits above the base of the jack. FIG. 17 depicts a jack 900 having a first ramp 901, a second ramp 902, a third ramp 903, a first top surface 904, a second top surface 905, and a base 906.

The jack can also include various features to provide structural support, for example, to allow the ramps and top surfaces to bear the weight of a vehicle. The invention is not limited to any particular means or providing such support. In some embodiments, support is provided via side enclosures that provide support for the one or more of the ramps and top surfaces along their edges. In some embodiments, reinforcing rods can be placed in the interior portions of the jack.

The jack can be made of any suitable material or combination of materials, so long as the materials provide sufficient strength to support a tandem-axle vehicle. Suitable materials include, but are not limited to: wood, such as hardwood; metals, such as iron and alloys thereof, and steel; polymers and various polymeric composites, such as fiberglass-polymer composites.

The jack may also include various features that assist with carrying and storage. For example, in come embodiments, the jack can include one or more handles. Further, in some embodiments, the first and second ramps can fold inwardly to minimize the space required for storage. As shown, for example, in FIG. 15, hinges 803 can be provided to permit various ramp portions to be folded up to minimize the footprint of the jack during storage.

In some embodiments, the first top surface or a portion of the first top portion can be attached from beneath to a lifting mechanism, which can elevate the first top or a portion thereof to a height above the rest of the jack. Any suitable lifting mechanism can be used. For example, in some embodiments, a crank lifting mechanism can be used. In some other embodiments, a lever-based lifting mechanism can be used. In some other embodiments, a hydraulic lifting mechanism can be used, such as a hydraulic lifting mechanism having one, two, three, four, five, six, or more barrels and pistons, and corresponding fluid cavities and pumps. In some embodiments, the jack includes one or more hollow cavities beneath the first top surface, which can house the lifting mechanism.

The jacks of any of the above embodiments can be configured to comprise one or more storage compartments. A storage compartment can be used to store any number of items depending on the available volume. For example, in some embodiments, the storage compartment might be used to store tools, spare parts, patch kits, and other items. In some embodiments, an empty volume can be provided above the base and below the upper surfaces (i.e., the ramps and top surfaces) of the jack and can provide one or more storage compartments. The size, number, and location of the storage compartments in a particular embodiment will impact the size and the materials used to construct the jack in order to provide the storage space while also insuring the jack's ability to support the weight of the vehicle while a tire is changed.

Figure 18:
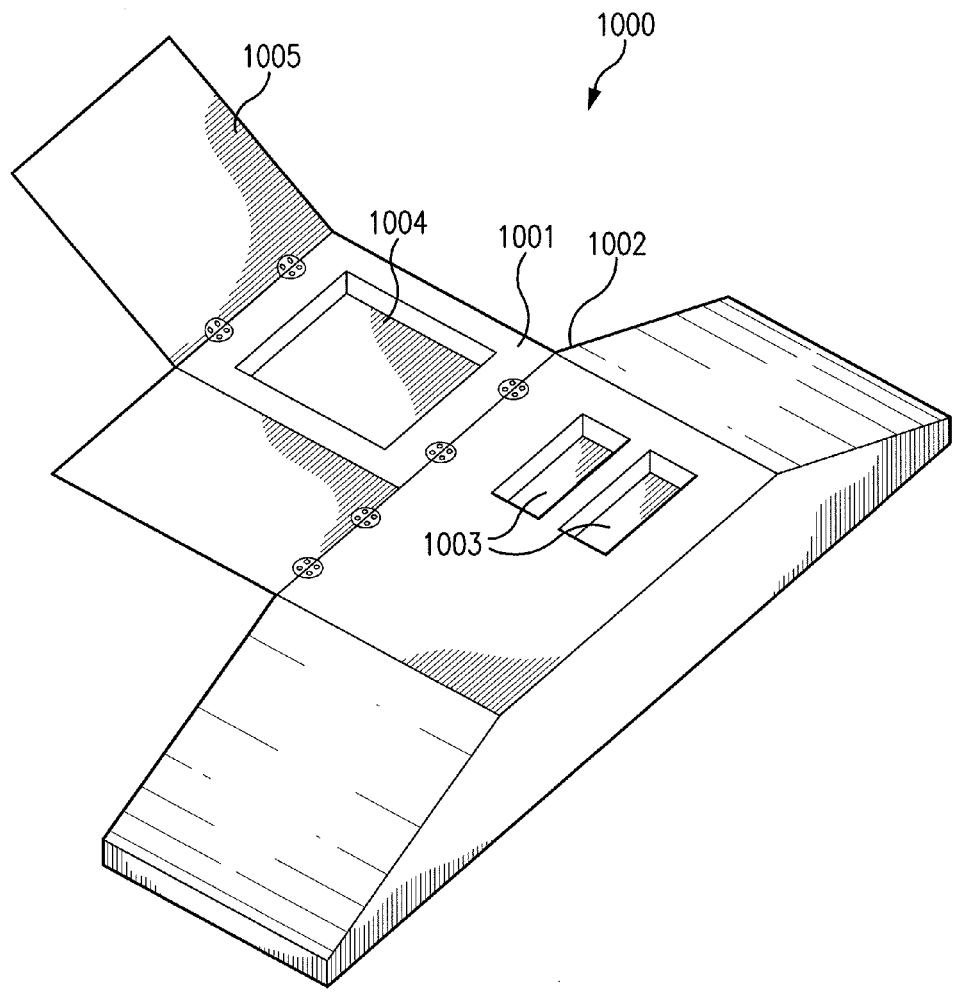
FIG. 18 depicts a jack having storage compartments in its interior volume according to one non-limiting embodiment of the present invention.

In at least one embodiment, the jack comprises a second removable section that comprises a portion of the second ramp and the entirety of the first top surface and the entirety of the third ramp. This second removable piece is removable by any suitable means. In some embodiments, the second removable piece is fitted into place. In other embodiments, the second removable piece is temporarily secured in place by some suitable means, such as a weak adhesive, Velcro, bolts, screws, and the like. In some embodiments, the removable piece is hinged to the jack, e.g., on the side panel of the jack. When this second removable piece is removed, the interior volume of the jack is exposed, such that the volume can be accessed used as a storage space. FIG. 18 shows a jack 1000 having a second removable piece 1001 that is hinged to the side panel 1002, which, when removed (or opened) exposes one or more lower storage compartments 1003 and/or one or more upper storage compartments 1004, which can optionally have a lid 1005. The invention is not limited to this particular storage configuration. A variety of other ways of creating storage compartments within the jack may be appreciated by the skilled artisan.

In some embodiments, the invention provides methods for elevating a tandem-axle vehicle, the method comprising: providing a jack according to any one of the above embodiments; and positioning a wheel of a first axle of the tandem-axle vehicle on the first top surface. The invention does not require that the wheel directly contact the first top surface. In some embodiments, the wheel that is situated on the first top surface is at least partially covered by a tire, which may be inflated, partially inflated, or flat. In such embodiments, the wheel of the first axle is positioned on the first top surface of the jack, while the wheel of the second axle is elevated above the ground without making contact with the jack. This allows the tire to be changed on the wheel of the second axle. In such embodiments, the second axle can either be in front of or behind the first axle.

In some embodiments, the method further includes removing the removable section from the jack before the positioning the wheel on the first top surface. Such embodiments find utility, in particular, when the frame of a tandem-axle vehicle, e.g., an agricultural trailer, is particularly low to the ground. By stair-stepping the elevation of the wheel (e.g., by moving the wheel along the first ramp, then the second top surface, then the third ramp, and then onto the first top surface), the frame of the trailer can more readily avoid making contact with the jack.

The invention is not limited to any particular tandem-axle vehicle. As used herein, the term "tandem-axle vehicle" at least includes, but is not limited to, flatbed trailers, livestock trailers, horse trailers, grain trailers, trucks, recreational vehicles, boat trailers, campers, military vehicles, and tractors.

Some tandem-axle vehicles have a feature where the two axles are connected via a lever-like structure that permits one of the two axles to drop when the other is raised. In some situations when a jack is being used, this feature of the axle system may make it more difficult to simultaneously elevate both axles using the jack. Thus, in some embodiments, the methods may comprise a step of locking (or stopping the lever action of) the levered axle system. Some embodiments of the present invention relate to devices that can be used to lock the levered axle system as described below. In some embodiments, the locking step comprises inserting a block between the lever mechanism and the frame of the vehicle. The size and shape of the block will vary depending on the axle and vehicle design.

In some embodiments, the invention provides devices for locking a spring assembly on a tandem-axle vehicle, such devices comprising: a block having a top surface, a bottom surface, and a plurality of side surfaces between the top surface and the bottom surface, wherein the top surface is substantially parallel to the bottom surface, wherein the distance between the top surface and the bottom surface is between about 2 and about 25 cm, and wherein the block is adapted to be inserted between a first leaf spring and a frame of a vehicle to lock the vehicle's spring assembly. In some embodiments, the distance between the top surface and the bottom surface of the block is between about 5 and about 15 cm.

In certain embodiments, the invention provides devices for locking a spring assembly on a tandem-axle vehicle, such devices comprising: a block having a top surface, a bottom surface, and a plurality of side surfaces between the top surface and the bottom surface, wherein the top surface is not parallel to the bottom surface, wherein the distance between the top surface and the bottom surface is between about 2 and about 25 cm, and wherein the top surface is angled between 5 and 45 degrees with respect to the bottom surface; wherein the block is adapted to be inserted between a first leaf spring and a frame of a vehicle to lock the vehicle's spring assembly. In some embodiments, the angle between the top surface and the bottom surface is between 10 and 35 degrees. In some embodiments, the distance between the top surface and the bottom surface is between about 2 and about 20 cm, or between about 2 and about 15 cm, or between about 5 and about 20 cm, or between about 5 and about 15 cm.

Figure 19:
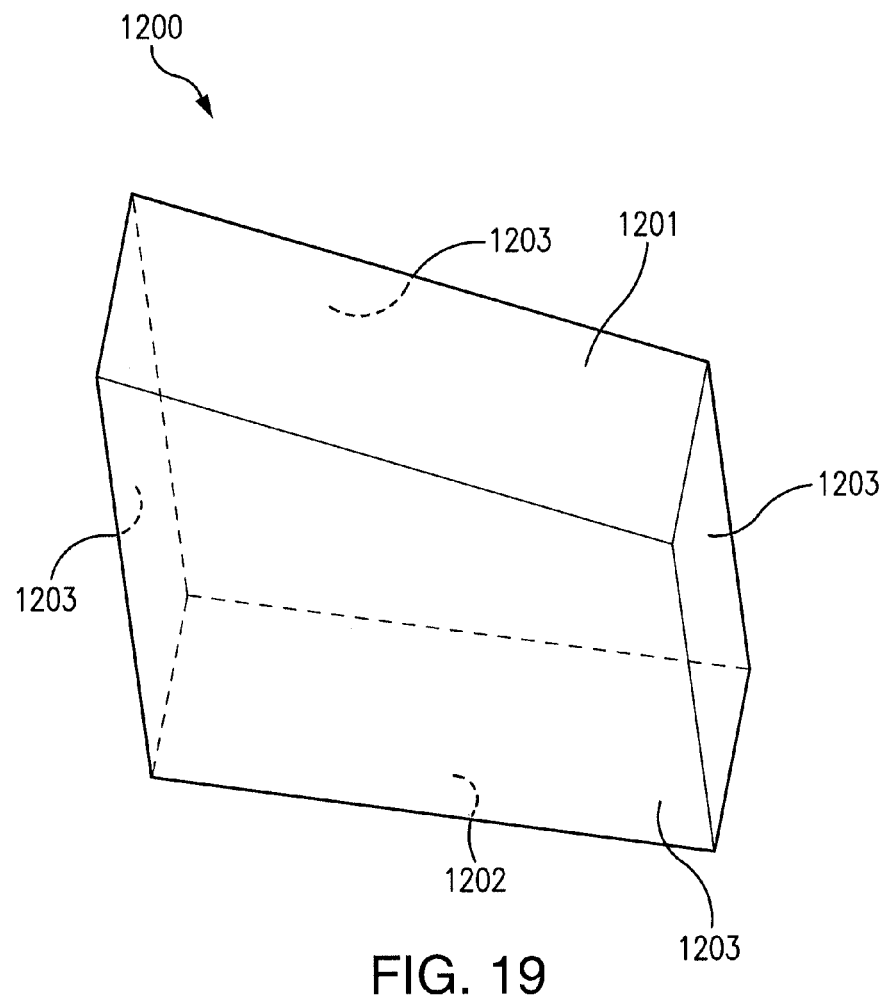
FIG. 19 depicts a locking device for a spring assembly on a tandem-axle vehicle according to one non-limiting embodiment of the present invention.

FIG. 19 shows an embodiment of such a device 1200. The device 1200 has a top surface 1201, a bottom surface 1202, and side surfaces 1203.

In some embodiments, the invention provides methods of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising: providing a block having a top surface, a bottom surface, and a plurality of side surfaces between the top surface and the bottom surface, wherein the top surface is substantially parallel to the bottom surface, and wherein the distance between the top surface and the bottom surface is between about 2 and about 25 cm; and inserting the block between the first leaf spring and the frame, such that the top surface of the block contacts the frame and the bottom surface of the block contacts the first leaf spring. In certain embodiments, the invention provides methods of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring is operably connected to a second axle, wherein one end of the second leaf spring is operably connected to the first spring hanger via a second equalizer, the method comprising: providing a block having a top surface, a bottom surface, and a plurality of side surfaces between the top surface and the bottom surface, wherein the top surface is not parallel to the bottom surface, wherein the distance between the top surface and the bottom surface is between about 2 and about 25 cm, and wherein the top surface is angled between 5 and 45 degrees with respect to the bottom surface; and inserting the block between the first leaf spring and the frame, such that the top surface of the block contacts the frame and the bottom surface of the block contacts the first leaf spring. A device according to any of the embodiments described immediately above can also be used.

In some embodiments, the locking device is inserted between the frame and the leaf spring of the lead axle (i.e., the axle of the tire or wheel that is to be positioned on the top surface of the jack). Inserting the locking device blocks the spring assembly from equalizing to its full degree, and thereby maintains the non-lead axle at a greater elevation than it otherwise would have. Thus, in some embodiments, the locking device can be used to provide greater ground clearance for the tire or wheel of the non-lead axle, thereby making it easier, for example, to change a tire on the non-lead axle.

Figure 20:
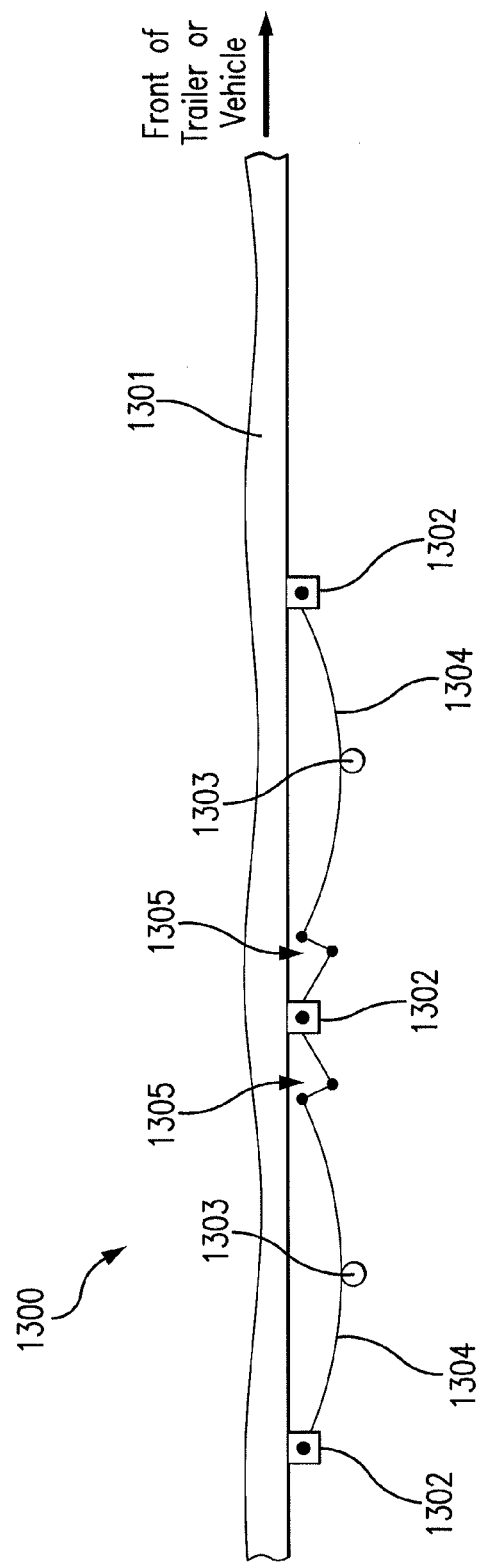
FIG. 20 depicts a spring assembly on a tandem-axle vehicle.
Figure 21:
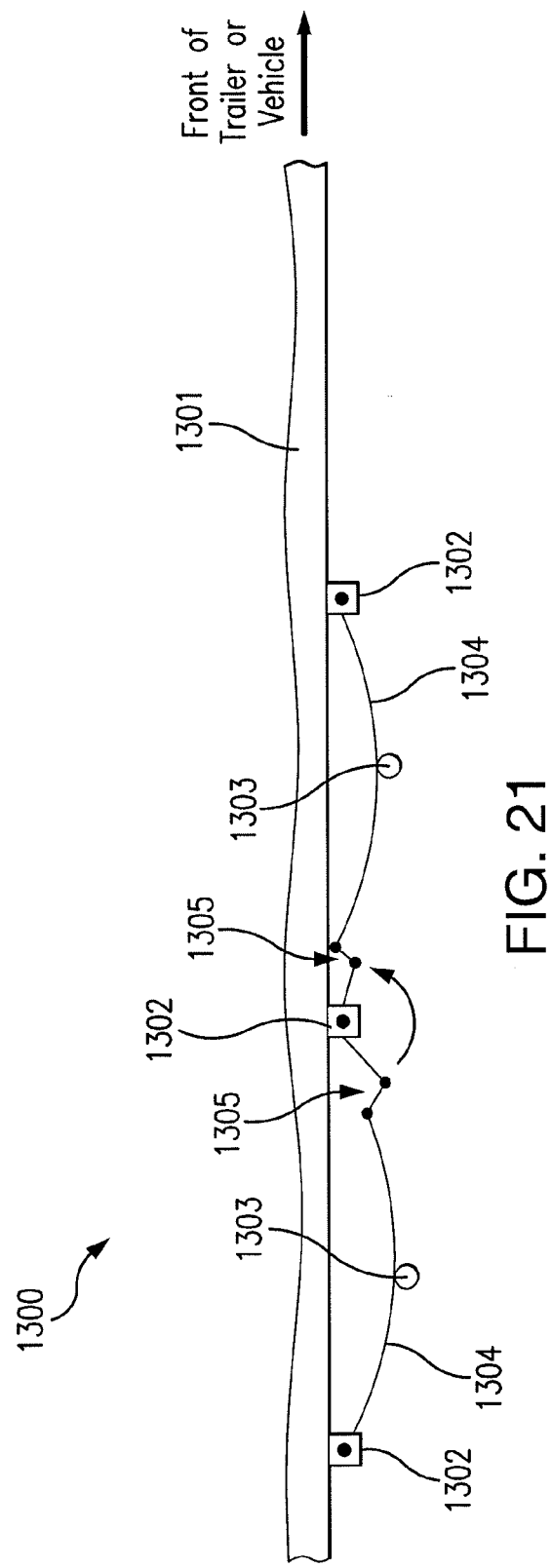
FIG. 21 depicts a spring assembly on a tandem-axle vehicle when a wheel on a front axle is raised.
Figure 22:
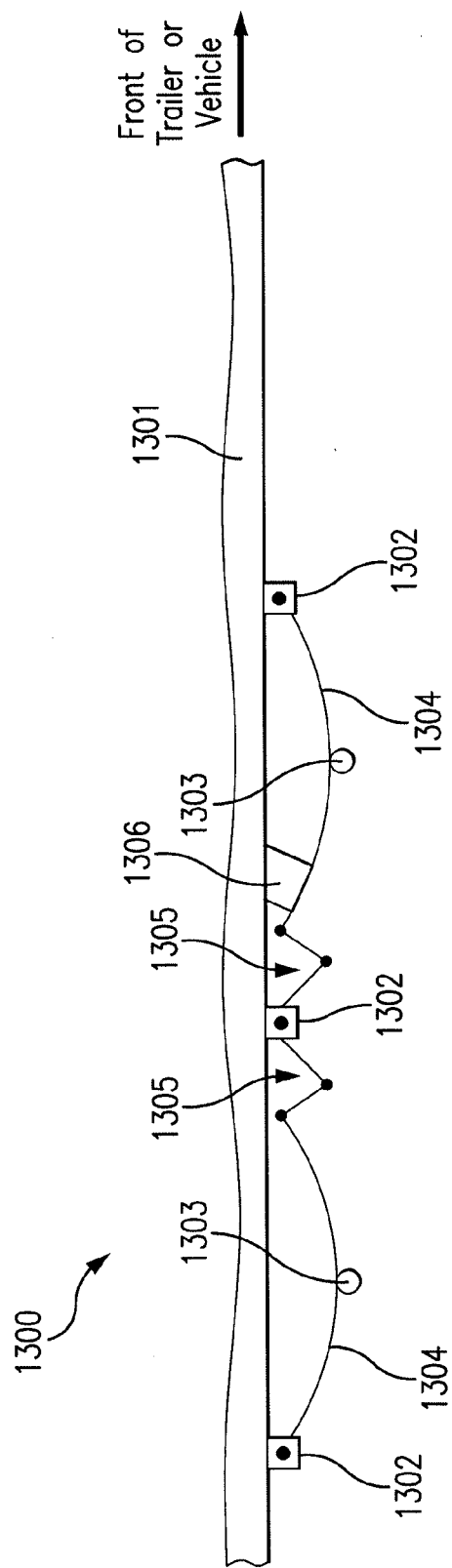
FIG. 22 depicts a spring assembly on a tandem-axle vehicle with a locking device according to one non-limiting embodiment of the present invention inserted between the vehicle frame and a part of the spring assembly.

FIG. 20 shows an example of a spring assembly for a tandem-axle vehicle 1300. The figure shows the frame 1301, the spring hangers 1302, the axles 1303, the leaf springs 1304, and the equalizers 1305. FIG. 21 shows an example of the position of the spring assembly as one of the axles is raised. FIG. 22 shows the frame 1301, the spring hangers 1302, the axles 1303, the leaf springs 1304, the equalizer 1305, and the device for locking the spring assembly 1306 according to one non-limiting embodiment of the present invention. As the front of the trailer or vehicle is on the right side of FIGS. 20-22, the axle 1303 on the right side of these Figures is the front or lead axle and the axle 1303 on the left side is the rear axle. As shown in FIG. 21, as the tandem-axle vehicle drives forward to mount a ramp jack, the lead axle 1303 is elevated. This causes the equalizer of the spring assembly to compensate and permit the rear (non-lead) axle 1303 to drop lower. As shown in FIG. 22, the locking device 1306 prevents this equalizing from occurring, which, in turn, prevents the rear axle 1303 (the axle on the left side of FIG. 22) from dropping lower as the lead axle 1303 (the axle on the right side of FIG. 22) mounts the ramp jack. When the wheel/tire of the lead axle 1303 has fully mounted the ramp jack, the insertion of the locking device 1306 assists in preventing the rear axle 1303 from dropping lower, thereby causing the wheel/tire of the rear axle 1303 to remain elevated off of the ground a greater distance than it would otherwise be without the use of the locking device 1306. In some embodiments, this can make it easier to access the wheel/tire of the rear axle and make it easier to change a flat tire, for example. In some embodiments, where a vehicle has particularly low clearance, the insertion of the locking device can cause the wheel/tire of the rear axle to be elevated off of the ground in instances where it would remain on the ground if the locking device were not employed.

In certain embodiments, the invention provides devices for locking a spring assembly on a tandem-axle vehicle, comprising: a block having a top surface, a bottom surface, and a plurality of side surfaces between the top surface and the bottom surface, wherein the distance between the top surface and the bottom surface is between about 2 and about 25 cm, wherein the bottom surface comprises at least three subsurfaces, such that a first subsurface and a second subsurface are in substantially the same plane, and a third subsurface is disposed between the first and second subsurfaces and forms a notch in the bottom surface; wherein the block is adapted to be inserted between a first leaf spring and a frame of a vehicle to lock the vehicle's spring assembly. In some embodiments, the distance between the top surface and the bottom surface is between about 2 and about 20 cm, or between about 2 and about 15 cm, or between about 5 and about 20 cm, or between about 5 and about 15 cm. In certain embodiments, the third subsurface has an arced or circular shape.

Figure 23:
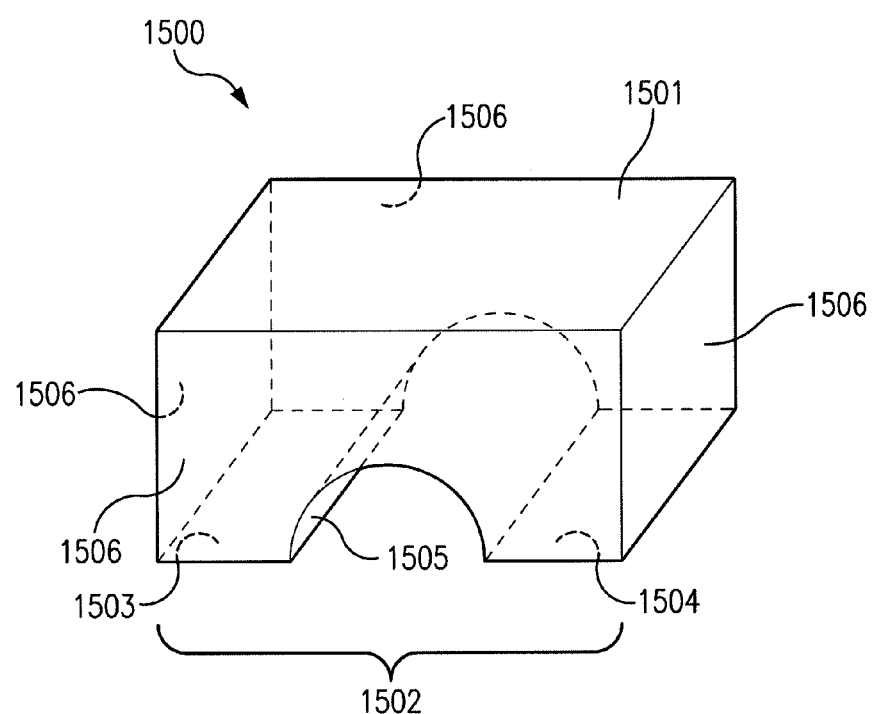
FIG. 23 depicts a locking device for a spring assembly on a tandem-axle vehicle according to one non-limiting embodiment of the present invention.

FIG. 23 shows an embodiment of such a device 1500. The device 1500 has a top surface 1501, a bottom surface 1502 having a first subsurface 1503 and a second subsurface 1504 and a third subsurface 1505, and side surfaces 1506.

While FIGS. 19 and 23 show devices for locking a spring assembly having certain shapes, it should be understood that other shapes can be selected so long as such devices having other shapes can sufficiently lock the spring assembly on a tandem-axle vehicle. Such shapes can include, for example, triangular solids, cubes, pentagonal solids, hexagonal solids, octagonal solids, etc.

In certain embodiments, the invention provides methods of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising: providing a block having a top surface, a bottom surface, and a plurality of side surfaces between the top surface and the bottom surface, wherein the distance between the top surface and the bottom surface is between about 2 and about 25 cm, wherein the bottom surface comprises at least three subsurfaces, such that a first subsurface and a second subsurface are in substantially the same plane, and a third subsurface is disposed between the first and second subsurfaces and forms a notch in the bottom surface; and inserting the block between the frame and the first leaf spring and between the frame and the first equalizer, such that the top surface of the block contacts the frame, the first subsurface of the bottom surface contacts the leaf spring, and the second subsurface of the bottom surface contacts the equalizer. In some embodiments, the distance between the top surface and the bottom surface of the block is between about 5 and about 15 cm. A device according to any of the embodiments described immediately above can also be used.

In some embodiments, the locking device is inserted between the frame and the leaf spring of the lead axle (i.e., the axle of the tire or wheel that is to be positioned on the top surface of the jack). Inserting the locking device blocks the spring assembly from equalizing to its full degree, and thereby maintains the non-lead axle at a greater elevation than otherwise. Thus, in some embodiments, the locking device can be used to provide greater ground clearance for the tire or wheel of the non-lead axle, thereby making it easier, for example, to change a tire.

Figure 24:
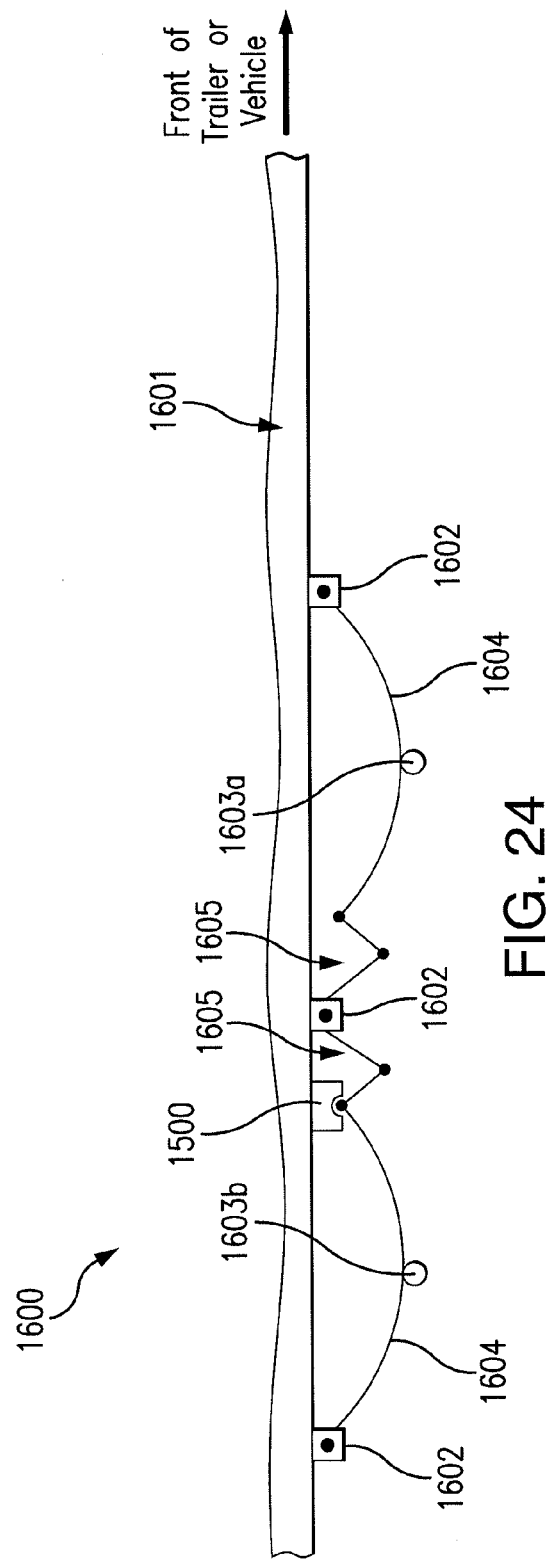
FIG. 24 depicts a spring assembly on a tandem-axle vehicle with a locking device according to one non-limiting embodiment of the present invention inserted between the vehicle frame and a part of the spring assembly.

Like FIG. 21, FIG. 24 shows a frame 1601 of a tandem-axle vehicle 1600, spring hangers 1602, axles 1603, leaf springs 1604, equalizer 1605, and the device for locking the spring assembly 1500. The front of the vehicle or trailer is on the right side of FIG. 24, but in this Figure, the vehicle 1600 is being backed onto the ramp jack (i.e., in reverse). In this scenario (with the vehicle being backed onto the ramp jack), the rear axle 1603b is the lead axle. As shown in FIG. 21, as the tandem-axle vehicle mounts the ramp jack, the lead axle 1603b is elevated. This causes the equalizer 1605 of the spring assembly to compensate and permit the front (non-lead) axle 1603a to drop lower. As shown in FIG. 24, the locking device 1500 prevents this equalizing from occurring, which, in turn, prevents the front axle 1603a from dropping lower as the rear (lead) axle 1603b mounts the ramp jack. When the wheel/tire of the lead axle 1603b has fully mounted the ramp jack, the insertion of the locking device 1500 assists in preventing the front axle 1603a from dropping lower, thereby causing the wheel/tire of the front axle 1603a to remain elevated off of the ground a greater distance than it would otherwise be without the use of the locking device 1500. In some embodiments, this can make it easier to access the wheel/tire of the rear axle and make it easier to change a flat tire, for example. In some embodiments, where a vehicle has particularly low clearance, the insertion of the locking device can cause the wheel/tire of the rear axle to be elevated off of the ground in instances where it would remain on the ground if the locking device were not employed.

In some embodiments of methods of locking a spring assembly on a tandem-axle vehicle where a device or block is inserted between a leaf spring and the frame of the vehicle, such methods can further comprise securing the device or block to the leaf spring and/or the frame. A number of techniques can be used secure or help hold the device or block in position. In some embodiments, any of the devices for locking a spring assembly on a tandem-axle vehicle disclosed herein can be at least partially magnetized. By at least partially magnetizing such devices, the magnetization can help hold the device in place on a metal leaf spring (or similar component of a tandem-axle vehicle) during usage. In some embodiments, such devices can be constructed from a magnetic material or incorporate a magnetic material. As one example, magnetic tape can be applied to one or more surfaces of such devices. Rather than at least partially magnetizing the devices according to some embodiments in order to secure or hold the device in place, other techniques can also be used. For example, in some embodiments, other techniques can be used to secure or help hold the device in place on a leaf spring or frame of a vehicle. Such techniques can include, without limitation, hook-and-loop fasteners, straps, clamps, clips, screws, double-sided tape, adhesive putty as well as other tacky substances, and combinations thereof.

Some embodiments of the present invention relate to systems for elevating a tandem-axle vehicle. In some embodiments, such systems comprise a device for locking a spring assembly on a tandem-axle vehicle and a ramp jack. The device for locking a spring assembly on a tandem-axle vehicle can include any of the devices for locking a spring assembly on a tandem-axle vehicle disclosed herein. In some embodiments, the ramp jack comprises any of the jacks of the present invention disclosed herein. The ramp jack, in some embodiments, comprises a conventional ramp jack.

It is to be understood that the present description illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present invention is not limited to the particular embodiments disclosed, but is intended to cover modifications that are within the spirit and scope of the invention.

I claim:

1. A method of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising:

inserting a device between the first leaf spring and the frame, wherein the device comprises a block having a top surface, a bottom surface, and a plurality of side surfaces between the top surface and the bottom surface, wherein the top surface is substantially parallel to the bottom surface, and wherein the distance between the top surface and the bottom surface is between about 2 and about 25 centimeters, and the device is inserted such that the top surface of the block contacts the frame and the bottom surface of the block contacts the first leaf spring.

2. The method of claim 1, wherein the distance between the top surface and the bottom surface of the block is between about 5 and about 15 centimeters.

3. The method of claim 1, further comprising coupling at least one of magnetic tape or at least a portion of a hook-and-loop fastener to at least one of the surfaces of the block.

4. The method of claim 1, wherein the block is a rectangular solid, a cube, a hexagonal solid, or an octagonal solid.

5. The method of claim 1, further comprising securing the device to at least one of the first leaf spring and the frame.

6. The method of claim 5, wherein the device is secured to the leaf spring or frame by at least one of magnetic tape, hook-and-loop fasteners, one or more straps, one or more clamps, one or more clips, one or more screws, and combinations thereof.

7. A method of elevating a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising:
  inserting a device between the first leaf spring and the frame, wherein the device comprises a block having a top surface, a bottom surface, and a plurality of side surfaces between the top surface and the bottom surface, wherein the top surface is substantially parallel to the bottom surface, and wherein the distance between the top surface and the bottom surface is between about 2 and about 25 centimeters, and the device is inserted such that the top surface of the block contacts the frame and the bottom surface of the block contacts the first leaf spring;
  providing a ramp jack;
  positioning a wheel on the first axle on a top surface of the ramp jack.

8. The method of claim 7, wherein the distance between the top surface and the bottom surface of the block is between about 5 and about 15 centimeters.

9. The method of claim 7, wherein the block is a rectangular solid, a cube, a hexagonal solid, or an octagonal solid.

10. A method of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising:
  inserting a device between the first leaf spring and the frame, wherein the device comprises a block having a top surface, a bottom surface, and a plurality of side surfaces between the top surface and the bottom surface, wherein the top surface is not parallel to the bottom surface, wherein the distance between the top surface and the bottom surface is between about 2 and about 25 cm, and wherein the top surface is angled between 5 and 45 degrees with respect to the bottom surface, and the device is inserted such that the top surface of the block contacts the frame and the bottom surface of the block contacts the first leaf spring.

11. The method of claim 10, wherein the distance between the top surface and the bottom surface of the block is between about 5 and about 15 centimeters.

12. The method of claim 10, wherein the block is a triangular solid or a pentagonal solid.

13. The method of claim 10, further comprising securing the device to at least one of the first leaf spring and the frame.

14. A method of elevating a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising:
  inserting a device between the first leaf spring and the frame, wherein the device comprises a block having a top surface, a bottom surface, and a plurality of side surfaces between the top surface and the bottom surface, wherein the top surface is not parallel to the bottom surface, wherein the distance between the top surface and the bottom surface is between about 2 and about 25 cm, and wherein the top surface is angled between 5 and 45 degrees with respect to the bottom surface, and the device is inserted such that the top surface of the block contacts the frame and the bottom surface of the block contacts the first leaf spring;
  providing a ramp jack;
  positioning a wheel on the first axle on a top surface of the ramp jack.

15. The method of claim 14, wherein the distance between the top surface and the bottom surface of the block is between about 5 and about 15 centimeters.

16. The method of claim 14, wherein the block is a triangular solid or a pentagonal solid.

17. A method of locking a spring assembly on a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising:
  inserting a device between the first leaf spring and the frame, wherein the device comprises a block having a top surface, a bottom surface, and a plurality of side surfaces between the top surface and the bottom surface, wherein the distance between the top surface and the bottom surface is between about 2 and about 25 cm, wherein the bottom surface comprises at least three subsurfaces, such that a first subsurface and a second subsurface are in substantially the same plane, and a third subsurface is disposed between the first and second subsurfaces and forms a notch in the bottom surface, and the device is inserted such that the top surface of the block contacts the frame and the bottom surface of the block contacts the first leaf spring.

18. The method of claim 17, wherein the third subsurface of the second surface is an arcuate surface.

19. The method of claim 17, wherein the distance between the top surface and the bottom surface is between about 5 and about 15 centimeters.

20. The method of claim 17, further comprising securing the device to at least one of the first leaf spring and the frame.

21. A method of elevating a tandem-axle vehicle having a first spring hanger disposed on a vehicle frame; a first leaf spring operably connected to a first axle, wherein one end of the first leaf spring is operably connected to the first spring hanger via a first equalizer; and a second leaf spring operably connected to a second axle, wherein one end of the second leaf spring is operably connected to the first spring hanger via a second equalizer, the method comprising:

inserting a device between the first leaf spring and the frame, wherein the device comprises a block having a top surface, a bottom surface, and a plurality of side surfaces between the top surface and the bottom surface, wherein the distance between the top surface and the bottom surface is between about 2 and about 25 cm, wherein the bottom surface comprises at least three subsurfaces, such that a first subsurface and a second subsurface are in substantially the same plane, and a third subsurface is disposed between the first and second subsurfaces and forms a notch in the bottom surface, and the device is inserted such that the top surface of the block contacts the frame and the bottom surface of the block contacts the first leaf spring;

providing a ramp jack;

positioning a wheel on the first axle on a top surface of the ramp jack.

22. The method of claim 21, wherein the third subsurface of the second surface is an arcuate surface.

23. The method of claim 21, wherein the distance between the top surface and the bottom surface is between about 5 and about 15 centimeters.

* * * * *